United States Patent
Takarabe

(10) Patent No.: US 12,484,093 B2
(45) Date of Patent: Nov. 25, 2025

(54) COMMUNICATION APPARATUS CONFIGURED TO START AND STOP OPERATION IN PREDETERMINED MODE FOR RECEIVING SETTING INFORMATION FROM INFORMATION PROCESSING APPARATUS

(71) Applicant: CANON KABUSHIKI KAISHA, Tokyo (JP)

(72) Inventor: Kei Takarabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 708 days.

(21) Appl. No.: 17/865,205

(22) Filed: Jul. 14, 2022

(65) Prior Publication Data
US 2023/0016767 A1    Jan. 19, 2023

(30) Foreign Application Priority Data
Jul. 16, 2021   (JP) .................................. 2021-117578

(51) Int. Cl.
H04W 76/10 (2018.01)
H04N 1/00 (2006.01)
H04W 24/02 (2009.01)

(52) U.S. Cl.
CPC ........ H04W 76/10 (2018.02); H04N 1/00315 (2013.01); H04W 24/02 (2013.01)

(58) Field of Classification Search
CPC .......................... H04W 76/10; H04N 1/00315
See application file for complete search history.

(56) References Cited

U.S. PATENT DOCUMENTS

| | | | |
|---|---|---|---|
| 2016/0162231 A1* | 6/2016 | Omata | G06F 3/1292 358/1.13 |
| 2017/0339288 A1* | 11/2017 | Okamura | G06F 3/1236 |
| 2017/0339698 A1 | 11/2017 | Takarabe | |
| 2017/0339743 A1* | 11/2017 | Watanabe | G06F 3/1236 |
| 2019/0068799 A1* | 2/2019 | Ishikawa | H04N 1/0022 |
| 2019/0079710 A1* | 3/2019 | Ito | G06F 3/1222 |
| 2019/0095367 A1* | 3/2019 | Kakio | H04L 41/0226 |
| 2019/0196761 A1* | 6/2019 | Minakawa | G06F 3/1238 |

(Continued)

FOREIGN PATENT DOCUMENTS

| | | |
|---|---|---|
| JP | 2015023440 A | 2/2015 |
| JP | 2021022876 A | 2/2021 |

OTHER PUBLICATIONS

Ming-Hour Yang: "Security analysis of application layer protocols on wireless local area networks", Journal of Shanghai Jiaotong University, Press, Heidelberg, vol. 16, No. 5, Oct. 2, 2011, XP019959972, pp. 586-592.

(Continued)

*Primary Examiner* — Nicholas Pachol
(74) *Attorney, Agent, or Firm* — Canon U.S.A., Inc. IP Division

(57) ABSTRACT

A control unit is configured to perform second control for stopping operation in a predetermined mode based on a second time shorter than a first time, the second time having elapsed with connection setting not made since the operation in the predetermined mode by a communication apparatus was started in a case where the communication apparatus is operating in the predetermined mode and the predetermined processing is completed.

22 Claims, 7 Drawing Sheets

(56) References Cited

U.S. PATENT DOCUMENTS

| | | | |
|---|---|---|---|
| 2020/0007348 A1* | 1/2020 | Kakutani | H04L 63/0823 |
| 2021/0034306 A1* | 2/2021 | Takeuchi | H04W 24/04 |
| 2021/0037160 A1* | 2/2021 | Watanabe | H04N 1/00909 |
| 2021/0315056 A1* | 10/2021 | Tsuchiya | H04W 76/10 |

OTHER PUBLICATIONS

Canon: PIXMA Manuals: "Setup Guide—MG3600 Series", Dec. 1, 2020, XP55982169, pp. 1-2, Internet Retrieval on Nov. 16, 2022.

* cited by examiner

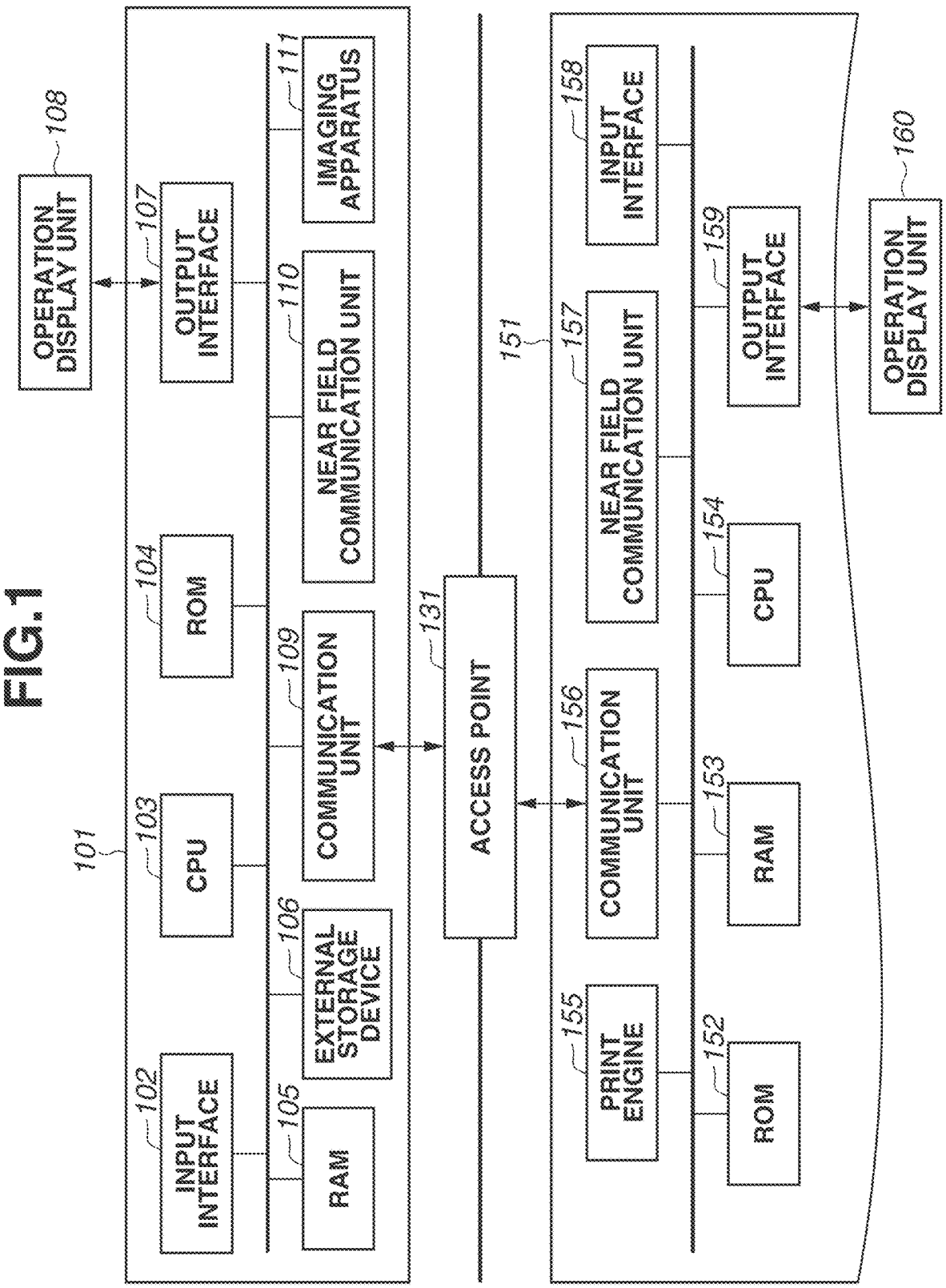

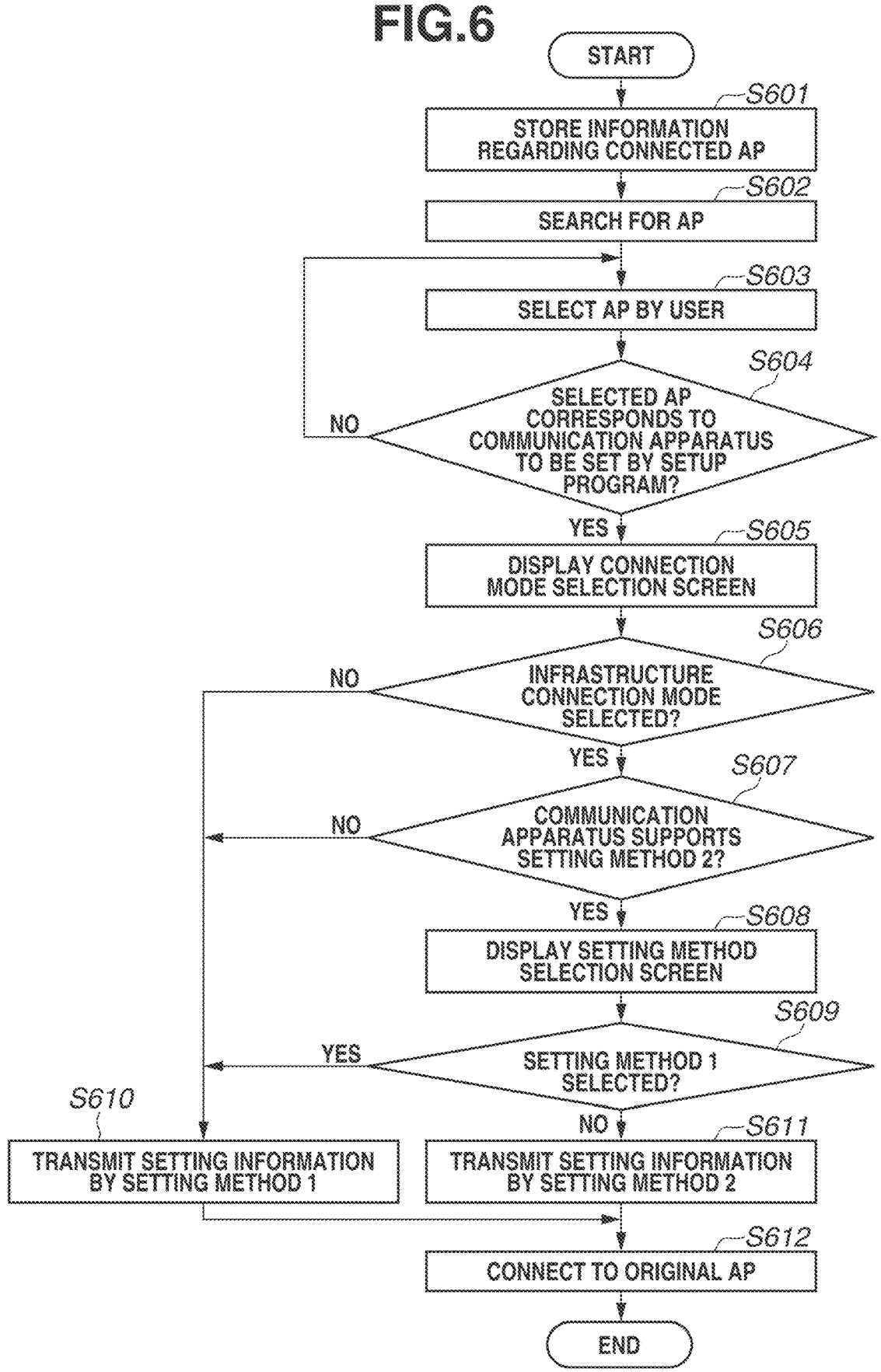

COMMUNICATION APPARATUS CONFIGURED TO START AND STOP OPERATION IN PREDETERMINED MODE FOR RECEIVING SETTING INFORMATION FROM INFORMATION PROCESSING APPARATUS

BACKGROUND

Field

The present disclosure relates to a communication apparatus and a control method for the communication apparatus.

Description of the Related Art

Communication apparatuses such as printers that communicate with terminal apparatuses such as personal computers (PC) or smartphones have been known. Such a communication apparatus performs connection setting processing for communicating with a terminal apparatus using a predetermined communication method such as Wireless Fidelity (Wi-Fi)®, for example. At the time, the communication apparatus operates in a connection setting state (connection setting mode) for performing the connection setting processing.

Japanese Patent Application Laid-Open Publication No. 2015-023440 discusses a communication apparatus operating in a soft access point (AP) mode that receives an apparatus information setting command and that sets an operation mode based on the received command.

The technique discussed in Japanese Patent Application Laid-Open Publication No. 2015-023440 is not seen to discuss controlling a timeout time of the soft AP mode.

SUMMARY

The present disclosure is directed to appropriately performing control for stopping an operation in a state for receiving setting information.

According to an aspect of the present disclosure, a communication apparatus includes a start unit configured to cause the communication apparatus to start operation in a predetermined mode for receiving setting information from an information processing apparatus, a setting unit configured to make connection setting of the communication apparatus based on the setting information in a case where the setting information is received from the information processing apparatus during the operation in the predetermined mode, an execution unit configured to perform predetermined processing to be completed based on a user operation, and a control unit configured to, in a case where the communication apparatus is operating in the predetermined mode and the predetermined processing is not completed, perform first control for stopping the operation in the predetermined mode based on a first time that has elapsed with the connection setting not made since the operation in the predetermined mode by the communication apparatus was started, and in a case where the communication apparatus is operating in the predetermined mode and the predetermined processing is completed, perform second control for stopping the operation in the predetermined mode based on a second time shorter than the first time, the second time having elapsed with the connection setting not made since the operation in the predetermined mode by the communication apparatus was started.

Further features of the present disclosure will become apparent from the following description of embodiments with reference to the attached drawings.

BRIEF DESCRIPTION OF THE DRAWINGS

FIG. 1 illustrates configurations of an information processing apparatus and a communication apparatus that are included in a communication system.

FIG. 6 is a flowchart illustrating processing performed by the information processing apparatus to cause a communication apparatus to perform connection setting processing.

DESCRIPTION OF THE EMBODIMENTS

Figure 2A:
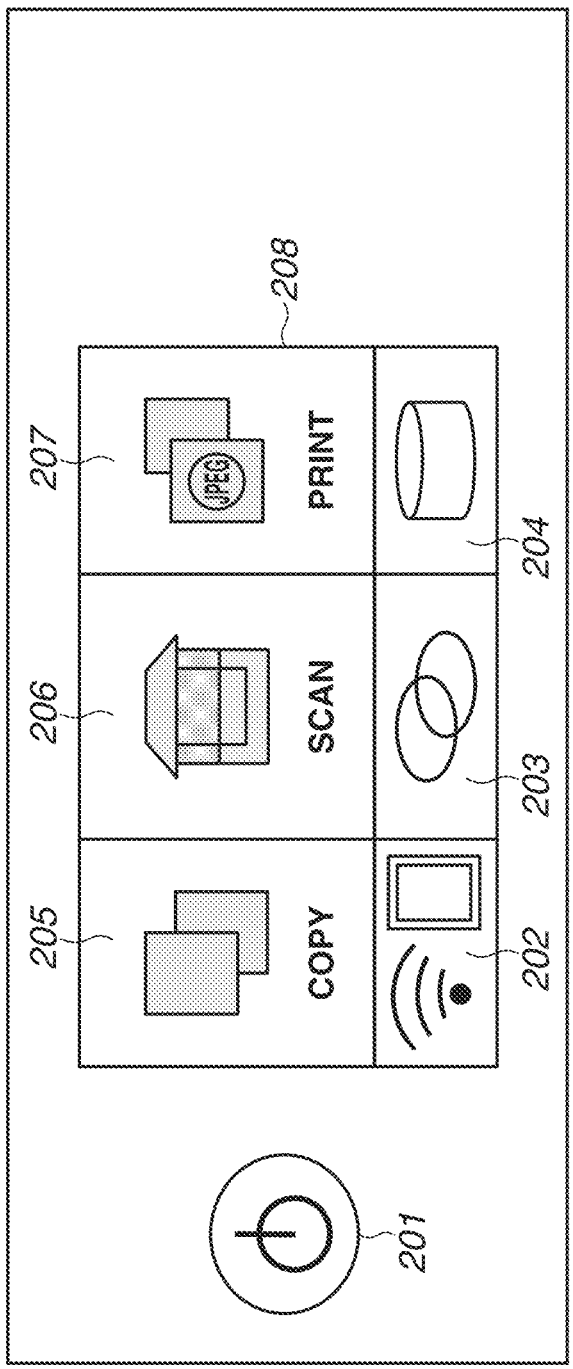
FIGS. 2A and 2B each illustrate an example of an operation display unit of the communication apparatus.

Hereinafter, some embodiments of the present disclosure will be described with reference to the drawings.

A first embodiment will be described. An information processing apparatus and a communication apparatus that are included in a communication system according to the present embodiment will be described. In the present embodiment, a smartphone is used as an example of an information processing apparatus, but the information processing apparatus is not limited to this. Various devices such as a mobile terminal, a laptop personal computer (PC), a tablet terminal, a personal digital assistant (PDA), or a digital camera can be used as the information processing apparatus. In the present embodiment, a printer is used as an example of a communication apparatus, but the communication apparatus is not limited to this. Various apparatuses can be used as long as the apparatuses can perform wireless communication with an information processing apparatus. For example, if the communication apparatus is a printer, an inkjet printer, a full-color laser beam printer, or a monochrome printer can be used as the communication apparatus. The communication apparatus is not limited to those printers. A copier, a facsimile device, a mobile terminal, a smartphone, a laptop PC, a tablet terminal, a PDA, a digital camera, a music reproduction device, a television, or a smart speaker can also be used as the communication apparatus. Aside from these, a multifunction peripheral including a plurality of functions such as a copy function, a FAX function, and a print function can also be used as the communication apparatus.

First of all, the configuration of an information processing apparatus included in a communication system according to the present embodiment, and the configuration of a communication apparatus that can communicate with the information processing apparatus will be described with reference to a block diagram illustrated in FIG. 1. In the present embodiment, the following configuration will be described as an example, but the functions are not limited to those illustrated in FIG. 1.

An information processing apparatus 101 includes an input interface 102, a central processing unit (CPU) 103, a read-only memory (ROM) 104, a random access memory (RAM) 105, an external storage device 106, an output interface 107, an operation display unit 108, a communication unit 109, a near field communication unit 110, and an imaging apparatus 111.

The input interface 102 is an interface for receiving data inputs and operation instructions from a user, and includes a physical keyboard, buttons, and a touch panel. The output interface 107 to be described below and the input interface 102 may be integrated as one component. That is, the one component may display a screen and receive operations from a user.

The CPU 103 is a system control unit and generally controls the information processing apparatus 101.

The ROM 104 stores fixed data such as control programs to be run by the CPU 103, data tables, and an embedded operating system (hereinafter, referred to as an OS) program. In the present embodiment, each control program stored in the ROM 104 performs software execution control such as scheduling, task switch, or interrupt processing under the control of the embedded OS stored in the ROM 104.

The RAM 105 includes a static random access memory (SRAM) with a backup power source. Because data is held in the RAM 105 with a primary battery for data backup (not illustrated), the RAM 105 can store important data such as program control variables without losing the data. The RAM 105 is also provided with a memory area for storing setting information for the information processing apparatus 101 and management data for the information processing apparatus 101. The RAM 105 is also used as a main memory and a work memory of the CPU 103.

The external storage device 106 includes an application program (hereinafter, will be described as a print application) providing a function of transmitting a print job to a communication apparatus 151 and causing the communication apparatus 151 to perform printing.

In the present embodiment, the print application also operates as a setup program for the communication apparatus 151, which will be described below. The setup program for the communication apparatus 151 is an application program having a function of transmitting setting information to be described below, to the communication apparatus 151. The setup program for the communication apparatus 151 is a program installed by a user onto the information processing apparatus 101 from a store application program, and is a program provided by a vendor of the communication apparatus 151. The external storage device 106 also includes various programs such as a printing information generation program for generating printing information interpretable by the communication apparatus 151, and an information transmission/reception control program for transmitting and receiving information to and from the communication apparatus 151 connected via the communication unit 109. The external storage device 106 stores various types of information to be used by these programs. The external storage device 106 also stores image data obtained from another information processing apparatus or the Internet via the communication unit 109.

The output interface 107 is an interface that controls the operation display unit 108 to display data and notify a user of the state of the information processing apparatus 101.

The operation display unit 108 includes a light emitting diode (LED) and a liquid crystal display (LCD), and displays data and notifies a user of the state of the information processing apparatus 101. By installing a software keyboard including keys such as numerical entry keys, a mode setting key, a determination key, a cancel key, and a power key on the operation display unit 108, entry from a user may be received via the operation display unit 108.

The communication unit 109 is a component for connecting with an apparatus such as the communication apparatus 151, and performing data communication. For example, the communication unit 109 can connect to an access point (AP) in the communication apparatus 151. By the communication unit 109 and the AP in the communication apparatus 151 connecting with each other, the information processing apparatus 101 and the communication apparatus 151 become ready to communicate with each other. The communication unit 109 may directly communicate with the communication apparatus 151 via wireless communication, or may communicate with the communication apparatus 151 via an access point 131 outside of the information processing apparatus 101 and the communication apparatus 151. Examples of wireless communication methods include communication methods complying with Institute of Electrical and Electronics Engineers (IEEE) 802.11 series communication standards, and the Bluetooth®. More specifically, the IEEE 802.11 series communication standards include the Wireless Fidelity (Wi-Fi)®. Examples of the access point 131 include devices such as a wireless local area network (LAN) router. In the present embodiment, a method by which the information processing apparatus 101 and the communication apparatus 151 directly connect with each other not via an external access point will be referred to as a direct connection method. A method by which the information processing apparatus 101 and the communication apparatus 151 connect with each other via the external access point 131 will be referred to as an infrastructure connection method.

The near field communication unit 110 is a component for performing near field communication with an apparatus such as the communication apparatus 151 and performing data communication, and performs communication using a communication method different from that of the communication unit 109. The near field communication unit 110 can connect with a near field communication unit 157 in the communication apparatus 151.

The imaging apparatus 111 is an apparatus that converts an image captured by an image sensor, into digital data. The digital data is once stored into the RAM 105. After that, the digital data is converted into a predetermined image format by a program being run by a CPU 154, and stored into the external storage device 106 as image data.

A ROM 152 stores fixed data such as control programs to be run by the CPU 154, data tables, and an OS program.

The communication apparatus 151 includes the ROM 152, a RAM 153, the CPU 154, a print engine 155, a communication unit 156, the near field communication unit 157, an input interface 158, an output interface 159, and an operation display unit 160. With a connection mode (communication mode) set, the communication apparatus 151 can operate in the set connection mode.

The communication unit 156 is a component for the communication apparatus 151 communicating with a different apparatus. In the present embodiment, the communication unit 156 performs communication in compliance with IEEE 802.11 series communication standards. The communication unit 156 includes an access point for connecting with an apparatus such as the information processing apparatus 101, as an internal access point of the communication apparatus 151. The access point can connect to the communication unit 109 of the information processing apparatus 101. The communication unit 156 may directly communicate with the information processing apparatus 101 via wireless communication, or may communicate with the information processing apparatus 101 via the access point 131. The communication unit 156 may also include hardware functioning as an access point, or may use software for causing the communication unit 156 to function as an access point to operate as an access point.

The RAM 153 includes a dynamic RAM (DRAM) with a backup power source. Because data is held in the RAM 153 on power supplied from a power source for data backup (not illustrated), the RAM 153 can store important data such as program control variables without volatilizing the data. The RAM 153 is also used as a main memory and a work memory of the CPU 154, and stores a receive buffer for temporarily storing printing information received from the information processing apparatus 101, and various types of information. The RAM 153 is also provided with a memory area for storing information indicating whether a corresponding timing is a timing at which setting of the communication apparatus 151 is made for the first time after power activation (hereinafter, default setting timing). In other words, the default setting timing is a default setting state in which the communication apparatus 151 has never completed default setting processing to be described below. The default setting processing is processing that makes progress based on a user operation.

The ROM 152 stores fixed data such as control programs to be run by the CPU 154, data tables, and an operating system program. In the present embodiment, each control program stored in the ROM 152 performs software execution control such as scheduling, task switch, or interrupt processing under the control of an embedded OS stored in the ROM 152. The ROM 152 is also provided with a memory area for storing data to be held even when power is not supplied, such as setting information for the communication apparatus 151 and management data for the communication apparatus 151.

The CPU 154 is a system control unit and generally controls the communication apparatus 151.

Based on information stored in the RAM 153 or a print job received from the information processing apparatus 101, the print engine 155 forms an image onto a recording medium such as paper using recording material such as ink, and outputs a printed result. A print job to be transmitted from the information processing apparatus 101 at this time has a large amount of transmission data through high-speed communication. The print job is therefore received via the communication unit 156 that can perform communication at higher speed than the near field communication unit 157.

The input interface 158 is an interface for receiving data inputs and operation instructions from a user, and includes a physical keyboard, buttons, and a touch panel. The output interface 159 to be described below and the input interface 158 may be integrated as one component. That is, the one component may display a screen and receive operations from a user. The output interface 159 is an interface that controls the operation display unit 160 to display data and notify a user of the state of the communication apparatus 151.

The operation display unit 160 includes an LED and a display unit such as an LCD, and displays data and notifies a user of the state of the communication apparatus 151. By installing a software keyboard including keys such as numerical entry keys, a mode setting key, a determination key, a cancel key, and a power key on the operation display unit 160, entry from a user may be received via the operation display unit 160.

<Direct Connection Method>

Direct connection refers to a form in which apparatuses directly (i.e., on a peer-to-peer (P2P) basis) establish wireless connection to one another not via an external device such as the access point 131. As one of connection modes, the communication apparatus 151 is operable in a mode (direct connection mode) for performing communication via direct connection. In Wi-Fi® communication, there are a plurality of modes for performing communication via direct connection such as a soft AP mode and a Wi-Fi Direct® (WFD) mode.

A mode for establishing direct connection in the WFD will be referred to as a WFD mode. A WFD is a standard stipulated by the Wi-Fi® Alliance. In a WFD mode, after searching of a device serving as a communication partner is made using a device search command, the roles of a P2P group owner (GO) and a P2P client are determined, and then remaining wireless connection processing is performed. The role determination corresponds to GO Negotiation in P2P communication, for example. Specifically, first of all, between two devices that perform communication, one device issues a device search command for searching for a device to be connected in a WFD mode. If the other device serving as a communication partner is discovered, the two devices check information regarding services and functions that can be provided by the devices. The device provision information check is optional, or not essential. The device provision information check phase corresponds to Provision Discovery in P2P communication, for example. Next, by checking the device provision information, the devices determine the device operating as a P2P client and the device operating as a P2P group owner, as their roles. Next, if the client and the group owner are determined, the devices exchange parameters for performing communication in the WFD. Based on the exchanged parameters, the P2P client and the P2P group owner perform remaining wireless connection processing and an Internet Protocol (IP) connection processing. In a WFD mode, the communication apparatus 151 may always operate as a GO without performing the above-described GO Negotiation. In other words, the communication apparatus 151 may operate in a WFD mode as an Autonomous GO mode. The state in which the communication apparatus 151 operates in a WFD mode can be rephrased as a state in which WFD connection is not established but the communication apparatus 151 operates as a GO, or a state in which WFD connection is established and the communication apparatus 151 operates as a GO, for example.

In a soft AP mode, between two devices that perform communication (e.g., the information processing apparatus 101 and the communication apparatus 151), one device (e.g., the information processing apparatus 101) becomes a client playing a role in requesting various services. Then, the other device implements a function of an access point in Wi-Fi® with settings of software. In a soft AP mode, a client searches for a device serving as a soft AP, using a device search command. If the soft AP is discovered, after remaining wireless connection processing (establishment of wireless connection, etc.) is performed between the client and the soft AP, IP connection processing (allocation of an IP address, etc.) is performed. Commands and parameters that are specified in the Wi-Fi® standards can be used in transmission and receipt in establishing wireless connection between a client and a soft AP, and the description thereof will be omitted. The state in which the communication apparatus 151 operates in a soft AP mode includes a state in which Wi-Fi® connection is not established but the communication apparatus 151 operates as a soft AP, and a state in which Wi-Fi® connection is established and the communication apparatus 151 operates as a soft AP, for example.

In the present embodiment, the communication apparatus 151 in a direct connection mode operates as a base station in a network including the communication apparatus 151. A base station is an apparatus that constructs a wireless network, and is an apparatus that provides a child station with a parameter to be used in connection to the wireless network. A parameter to be used in connection to a wireless network is related to a communication channel to be used by the base station, for example. By receiving a parameter, the child station connects to a wireless network constructed by the base station, using a communication channel used by the base station. As the communication apparatus 151 operates as a base station in the direct connection mode, the communication apparatus 151 can determine a communication channel to be used in communication in the direct connection mode. If the communication apparatus 151 concurrently operates in an infrastructure connection mode and a direct connection mode, for example, the communication apparatus 151 performs control in such a manner as to use a communication channel used in communication in the infrastructure connection mode, also in communication in the direct connection mode. As a communication channel to be used in communication in a direct connection mode, for example, the communication apparatus 151 may preferentially select a communication channel used in connection with the access point 131, over other channels.

Connection information (service set identifier (SSID) and password) for connecting with the communication apparatus 151 in a direct connection mode may be arbitrarily changed in accordance with user operation performed on an operation unit included in the communication apparatus 151.

<Infrastructure Connection Method>

An infrastructure connection is a form in which devices that perform communication (e.g., the information processing apparatus 101 and the communication apparatus 151) connect to an access point (e.g., the access point 131) controlling a network of the devices, and the devices communicate with one another via the access point. As one of connection modes, the communication apparatus 151 is also operable in a mode (infrastructure connection mode) for performing communication via infrastructure connection.

In an infrastructure connection, each device searches for an access point using a device search command. If an access point is discovered, after remaining wireless connection processing (establish of wireless connection, etc.) is performed between the device and the access point, IP connection processing (allocation of an IP address, etc.) is performed. Commands and parameters that are specified in the Wi-Fi® standard can be used in transmission and receipt in establishing wireless connection between the device and the access point, and the description thereof will be omitted.

In the present embodiment, when the communication apparatus 151 operates in an infrastructure connection mode, the access point 131 operates as a base station and the communication apparatus 151 operates as a child station. The communication apparatus 151 and the information processing apparatus 101 become ready to communicate with each other via the access point 131. A channel to be used in communication via infrastructure connection may be a frequency band (5 gigahertz (Ghz) band, etc.) other than 2.4 Ghz band. For communicating with the communication apparatus 151 via the access point 131, the information processing apparatus 101 determines that the communication apparatus 151 belongs to a network formed with the access point 131, to which the information processing apparatus 101 belongs.

In the present embodiment, a state in which the information processing apparatus 101 and the communication apparatus 151 simply connect to the same access point is regarded as an infrastructure connection state. In other words, an infrastructure connection state entails a connection alone of the information processing apparatus 101 and the communication apparatus 151 to the same access point, and no determination by the information processing apparatus 101 or the communication apparatus 151 that a partner apparatus also belongs to a network to which it belongs. In the present embodiment, the communication apparatus 151 can concurrently establish direct connection and infrastructure connection. In other words, the communication apparatus 151 can concurrently establish Wi-Fi® connection in which the communication apparatus 151 operates as a child station, and Wi-Fi® connection in which the communication apparatus 151 operates as a base station. Operating in a state in which the above-described two connections are concurrently established in this manner will be referred to as a simultaneous operation. In the case of performing a simultaneous operation, the communication apparatus 151 makes consistency between a frequency band and a communication channel to be used in infrastructure connection, and a frequency band and a communication channel to be used in direct connection. Nevertheless, in the present embodiment, if the communication apparatus 151 uses the 5 GHz frequency band in infrastructure connection, the communication apparatus 151 avoids operating in a direct connection mode, which does not perform simultaneous operation. This is because a communication channel to be used at the 5 GHz frequency band can be changed by Dynamic Frequency Selection (DFS).

<Connection Setting Processing>

In the present embodiment, the information processing apparatus 101 makes settings (connection settings) for operating the communication apparatus 151 using at least one of infrastructure connection or direct connection via wireless communication with the communication apparatus 151. The connection setting processing according to the present embodiment will also be referred to as cableless setup (CLS) because connection setting processing is performed via wireless communication. The connection setting processing may however be performed via cable communication.

The communication apparatus 151 is operable in the connection setting mode (connection setting state) as a mode for performing connection setting processing, and performs the connection setting processing in the connection setting mode. The details of the connection setting mode will be described below.

With the communication apparatus 151 in operation in the infrastructure connection mode, the information processing apparatus 101 wirelessly transmits infrastructure setting information as setting information for operating the communication apparatus 151 in the infrastructure connection mode, to the communication apparatus 151. The infrastructure setting information includes information regarding the access point 131. The information regarding the access point 131 includes an SSID, a password, and information regarding a frequency band, for example.

On the other hand, with the communication apparatus 151 in operation in the direct connection mode, the information processing apparatus 101 wirelessly transmits direct setting information as setting information for operating the communication apparatus 151 in the direct connection mode, to the communication apparatus 151. The direct setting information includes an instruction for enabling a WFD function to operate the communication apparatus 151 as a Group Owner, and enabling access point setting of the communication apparatus 151. The information processing apparatus 101 also acquires connection information for directly connecting with the communication apparatus 151 from the communication apparatus 151. The connection information for directly connecting with the communication apparatus 151 includes information such as an SSID and the password for the communication apparatus 151, for example.

In the present embodiment, transmitting infrastructure setting information or direct setting information and acquiring information for directly connecting with the communication apparatus 151 that are to be made in the connection setting processing involve direct connection for a connection setting between the information processing apparatus 101 and the communication apparatus 151. In the present embodiment, connection setting processing is then performed in compliance with Wi-Fi® to establish the direct connection for the connection setting. Alternatively, a wireless communication standard other than Wi-Fi®, such as Bluetooth®, for example, may be used, or a cable communication standard such as a wired LAN or a universal serial bus (USB) may be used.

After infrastructure connection or direct connection is established in compliance with Wi-Fi® between the information processing apparatus 101 and the communication apparatus 151 by the connection setting processing, the information processing apparatus 101 and the communication apparatus 151 can communicate with each other via the established connection. Specifically, via the established connection, the information processing apparatus 101 can transmit a print job for causing the communication apparatus 151 to perform printing, and a scan job for causing the communication apparatus 151 to perform scan, for example, to the communication apparatus 151.

In the present embodiment, the communication apparatus 151 can be operated either in the infrastructure connection mode or in the direct connection mode by the connection setting processing, but the configuration is not limited to this configuration. For example, a configuration may be employed in which the communication apparatus 151 can be operated in the infrastructure connection mode alone (i.e., the communication apparatus 151 cannot be operated in the direct connection mode).

In the present embodiment, in connection setting processing performed using Setting Method 1 to be described below, the communication apparatus 151 can be operated either in the infrastructure connection mode or in the direct connection mode. In other words, in Setting Method 1, while infrastructure setting information is transmitted from the information processing apparatus 101 in some cases, direct setting information is transmitted from the information processing apparatus 101 in other cases. Nevertheless, in connection setting processing performed using Setting Method 2 to be described below, the communication apparatus 151 can be operated in the infrastructure connection mode, but not in the direct connection mode. In other words, in Setting Method 2, while infrastructure setting information is transmitted from the information processing apparatus 101 in some cases, direct setting information is not transmitted from the information processing apparatus 101 in any case.

<Connection Setting Mode>

As described above, the communication apparatus 151 is operable in a connection setting mode. The communication apparatus 151 may be caused to start operating in the connection setting mode by the user's press of a button for a connection setting mode, or the activation (transition to a software-on state) of the communication apparatus 151, for example. The button for the connection setting mode may be a hardware button included in the communication apparatus 151, or may be a software button displayed by the communication apparatus 151 on the operation display unit 160. In a case where the communication apparatus 151 starts to operate in the connection setting mode, the communication apparatus 151 enables Wi-Fi® communication. Specifically, the communication apparatus 151 is operated as an AP dedicated for a connection setting mode. The communication apparatus 151 thereby becomes ready to establish direct connection with the information processing apparatus 101 via Wi-Fi® communication. Connection information (SSID, etc.) for connecting with an AP dedicated for the connection setting mode is preliminarily stored in the setup program for the communication apparatus 151 installed on the information processing apparatus 101, and the information processing apparatus 101 preliminarily recognizes the connection information for connecting with a soft AP dedicated for the connection setting mode. Thus, at least part of the connection information for connecting with the soft AP dedicated for the connection setting mode (at least a part of an SSID, etc.) cannot be changed by the user unlike connection information about an access point enabled in the direct connection mode. In the present embodiment, a password is not set for connecting with the soft AP dedicated for the connection setting mode. As long as the information processing apparatus 101 recognizes an SSID, the information processing apparatus 101 can connect with the communication apparatus 151 operating in the connection setting mode, without using a password. Nevertheless, the configuration is not limited to this configuration. As another configuration, a password for connecting with the soft AP dedicated for the connection setting mode may also be preliminarily stored in the setup program for the communication apparatus 151, and connection with the communication apparatus 151 operating in the connection setting mode may be established using the password.

In the connection setting mode, the communication apparatus 151 may connect with the information processing apparatus 101 not via normal Wi-Fi® but via the WFD. More specifically, the communication apparatus 151 may operate as a GO and receive setting information from the information processing apparatus 101 via WFD communication. In the connection setting mode, the communication apparatus 151 may also connect with the information processing apparatus 101 via Bluetooth®. More specifically, the communication apparatus 151 may operate as a child device in Bluetooth® and receive setting information from the information processing apparatus 101 via Bluetooth® communication (communication via Bluetooth® connection). The Bluetooth® may be Bluetooth® Classic or Bluetooth® Low Energy (BLE). With the BLE used, in a case where the communication apparatus 151 starts to operate in the connection setting mode, the communication apparatus 151 starts transmission of advertisement information based on the BLE standards, and becomes ready to establish BLE connection with the information processing apparatus 101 that has received the advertisement information. In the connection setting mode, both Wi-Fi® and Bluetooth® may be available. More specifically, in the connection setting mode, in a case where the communication apparatus 151 receives a connection request from the information processing apparatus 101 via Wi-Fi® connection, the communication apparatus 151 may receive setting information via the Wi-Fi® connection, and in a case where the communication apparatus 151 receives a connection request from the information processing apparatus 101 via Bluetooth® connection, the communication apparatus 151 may receive setting information via the Bluetooth® connection.

In the present embodiment, the communication apparatus 151 operating in the connection setting mode can receive setting information from the information processing apparatus 101 using at least two methods (Setting Method 1 and Setting Method 2).

First of all, Setting Method 1 will be described. Setting Method 1 is a method of receiving setting information from the information processing apparatus 101 using a communication protocol different from a communication protocol used in Setting Method 2. Specifically, the communication protocol used in Setting Method 1 is a Simple Network Management Protocol (SNMP), for example. As described above, in the present embodiment, to set the communication apparatus 151 to the infrastructure connection mode, the information processing apparatus 101 transmits infrastructure setting information for connecting with the access point 131, for example, to the communication apparatus 151. In other words, to set the communication apparatus 151 to the infrastructure connection mode, the information processing apparatus 101 acquires a password for connecting with the access point 131. Nevertheless, in the present embodiment, in transmitting setting information to the communication apparatus 151 using Setting Method 1 by the setup program for the communication apparatus 151 even under the condition that the information processing apparatus 101 has ever connected with the access point 131 or is connecting with the access point 131, the information processing apparatus 101 acquires the password by receiving the entry of the password from the user on a screen displayed by the setup program for the communication apparatus 151. This is because the setup program for the communication apparatus 151 cannot acquire a password for connecting with the access point 131 from an OS of the information processing apparatus 101 in transmitting setting information to the communication apparatus 151 using Setting Method 1. For this reason, Setting Method 1 can be rephrased as a method of receiving the entry of a password from the user on a screen displayed by the setup program for the communication apparatus 151 after a setting instruction for making setting of the connection mode for the communication apparatus 151 is received from the user on the screen displayed by the setup program for the communication apparatus 151. Furthermore, Setting Method 1 can be rephrased as a method of performing connection setting processing of the communication apparatus 151 by transmitting infrastructure setting information including the password received in this manner to the communication apparatus 151 by the setup program for the communication apparatus 151. Whichever of wired equivalent privacy (WEP), Wi-Fi Protected Access (WPA), WPA2, and WPA3 is used as a security method for an AP, Setting Method 1 can transmit infrastructure setting information for connecting with the AP to the communication apparatus 151. Then, Setting Method 1 transmits infrastructure setting information including information indicating the security method for the AP. The communication protocol used in Setting Method 1 is not limited to the SNMP, and a different communication protocol may be used.

Next, Setting Method 2 will be described. Specifically, the communication protocol used in Setting Method 2 is a HyperText Transfer Protocol (HTTP), for example. In the present embodiment, in transmitting setting information to the communication apparatus 151 using Setting Method 2 under the condition that the information processing apparatus 101 has ever connected with the access point 131 or is connecting with the access point 131, the information processing apparatus 101 can acquire the password from an OS of the information processing apparatus 101 without receiving the entry of the password from the user.

For this reason, Setting Method 2 can be rephrased as a method of acquiring a password from an OS of the information processing apparatus 101 without receiving the entry of the password from the user on a screen displayed by the setup program for the communication apparatus 151 after the setting instruction is received from the user on the screen displayed by the setup program for the communication apparatus 151. Furthermore, Setting Method 2 can be rephrased as a method of performing connection setting processing of the communication apparatus 151 by transmitting infrastructure setting information including the password received in this manner to the communication apparatus 151. In connecting with the access point 131 for the first time, the information processing apparatus 101 receives the user's entry of a password for connecting with the access point 131 before connecting with the access point 131. Then, in Setting Method 2, a password that has been entered by the user before connection with the access point 131 and has been stored in the OS is acquired from the OS and is transmitted. For this reason, Setting Method 2 can be further rephrased as a method of communicating the password without the user entering the password to the information processing apparatus 101 after the information processing apparatus 101 connects with the access point 131. The transmission of setting information using Setting Method 2 is carried out by a predetermined setting application program for transmitting infrastructure setting information using Setting Method 2. The predetermined setting application program is a program preinstalled on the information processing apparatus 101, and is a program provided by an OS vendor of the information processing apparatus 101. Thus, the predetermined setting application program can acquire information that cannot be acquired by other application programs (e.g., password for connecting with an AP) from an OS. The transmission of setting information using Setting Method 2 may be performed by the setup program for the communication apparatus 151. In this case, for example, the setup program for the communication apparatus 151 may execute an application program interface (API) for Setting Method 2 to acquire a password from an OS. If a security method for an AP is the WPA or the WPA2, Setting Method 2 can transmit infrastructure setting information for connecting with the AP, to the communication apparatus 151. On the other hand, if a security method for an AP is the WEP or the WPA3, Setting Method 2 cannot transmit infrastructure setting information for connecting with the AP to the communication apparatus 151. Setting Method 2 transmits infrastructure setting information not including information indicating the security method for the AP. The communication protocol used in Setting Method 2 is not limited to the HTTP. For example, the Device Provisioning Protocol (DPP) stipulated by the Wi-Fi® Alliance may be used. In other words, Setting Method 2 may be a setting method that uses a function called Wi-Fi® Easy Connect. The information processing apparatus 101 can also acquire a password included in infrastructure setting information to be transmitted using the DPP from the OS of the information processing apparatus 101 without receiving a user entry after a setting instruction is received from the user on a screen displayed by the setup program for the communication apparatus 151. For example, the communication apparatus 151 may be able to further receive setting information using Setting Method 3 different from Setting Methods 1 and 2, and the DPP may be used in Setting Method 3.

In the present embodiment, the communication apparatus 151 in the connection setting mode operates in at least one of a state (state for Setting Method 1) in which setting information can be received using Setting Method 1 or a state (state for Setting Method 2) in which setting information can be received using Setting Method 2. A condition for ending the state for Setting Method 1 (condition for Setting Method 1) and a condition for ending the state for Setting Method 2 (condition for Setting Method 2) can be separately set. In other words, while the communication apparatus 151 operates in some cases in a connection setting mode in which setting information can be received using Setting Method 1 and setting information can also be received using Setting Method 2, the communication apparatus 151 operates in other cases in a connection setting mode in which setting information can be received using Setting Method 1 but setting information is not received using Setting Method 2, for example.

In the present embodiment, the communication apparatus 151 transmits a predetermined beacon to nearby apparatuses in the state for Setting Method 2. Then, by receiving the predetermined beacon, the information processing apparatus 101 determines that the communication apparatus 151 is in the state for Setting Method 2. In the present embodiment, with a predetermined OS supporting Setting Method 2 installed on the information processing apparatus 101, Setting Method 2 allows the communication apparatus 151 to perform connection setting processing.

In the present embodiment, the condition for Setting Method 1 and the condition for Setting Method 2 include an end of an operation in the connection setting mode, for example. The condition for ending an operation in the connection setting mode is a connection mode (direct connection mode or infrastructure connection mode) of the communication apparatus 151 set based on setting information received from the information processing apparatus 101, for example. The condition for Setting Method 1 also includes an elapsed time of the state for Setting Method 1 exceeding a threshold value (timeout time). The condition for Setting Method 2 also includes an elapsed time of the state for Setting Method 2 exceeding a timeout time. The timeout time defined for the condition for Setting Method 1 will be referred to as a timeout time for Setting Method 1, and the timeout time defined for the condition for Setting Method 2 will be referred to as a timeout time for Setting Method 2. The elapsed time of the state for Setting Method 1 is a time that has elapsed without the end of the operation in the state for Setting Method 1 since an operation in the state for Setting Method 1 was started. In other words, the count of a mode elapse time of the state for Setting Method 1 is stopped in a case where an operation in the state for Setting Method 1 is ended. If both the elapsed time of the state for Setting Method 1 and the elapsed time of the state for Setting Method 2 exceed the respective timeout times, and the state for Setting Method 1 and the state for Setting Method 2 end, the connection setting mode is also ended. The elapsed time of the state for Setting Method 1 is not limited to the above-described elapsed time. For example, the elapsed time of the state for Setting Method 1 may be a time that has elapsed without the connection between the information processing apparatus 101 and the communication apparatus 151 by an AP for the connection setting mode since an operation in the state for Setting Method 1 was started. In other words, the count of the elapsed time of the state for Setting Method 1 may be stopped in a case where the information processing apparatus 101 and the communication apparatus 151 are connected by an AP for the connection setting mode. Alternatively, the elapsed time of the state for Setting Method 1 may be a time that has elapsed without the receipt by the communication apparatus 151 of setting information transmitted by the information processing apparatus 101 since operation in the state for Setting Method 1 was started. In other words, the count of the elapsed time of the state for Setting Method 1 may be stopped in a case where setting information transmitted by the information processing apparatus 101 is received by the communication apparatus 151. The definition of the elapsed time of the state for Setting Method 2 is similar to that of the elapsed time of the state for Setting Method 1. The reason why the timeout time is set is because the connection setting mode is a mode in which connection can be established without requiring a password, or a mode in which connection can be established using a password preliminarily stored in the setup program for the communication apparatus 151. In other words, the reason is because, while the connection setting mode is advantageous in that connection can be established easily, the security is low and connection unintended by the user of the communication apparatus 151 is highly likely to be established if the connection setting mode is maintained for a long time.

Meanwhile, as described above, in the present embodiment, when the infrastructure connection mode is set by the communication apparatus 151 performing connection setting processing using Setting Method 1, the information processing apparatus 101 receives the entry of a password from the user after receiving a setting instruction. On the other hand, when the infrastructure connection mode is set by the communication apparatus 151 performing connection setting processing using Setting Method 2, the information processing apparatus 101 does not receive the entry of a password from the user after receiving a setting instruction. In other words, as the entry of a password is not received from the user, the information processing apparatus 101 can transmit infrastructure setting information to the communication apparatus 151 quickly in a case where the communication apparatus 151 performs connection setting processing using Setting Method 2, as compared with a case where the communication apparatus 151 performs connection setting processing using Setting Method 1. In other words, the communication apparatus 151 can complete connection setting processing fast in performing connection setting processing using Setting Method 2, as compared with the case of performing connection setting processing using Setting Method 1.

In view of security improvement and fast completion of connection setting processing in Setting Method 2, it is suitable to set the timeout time for Setting Method 2 to a short time. Thus, in the present embodiment, control is performed in such a manner that the timeout time for Setting Method 2 is set to a time shorter than the timeout time for Setting Method 1 at least in a partial period.

One condition under which an operation in the connection setting mode starts in the present embodiment is, for example, the receipt of a press of a power button in a state with a default setting of the communication apparatus 151 incomplete.

After starting an operation in the connection setting mode with the condition satisfied, the communication apparatus 151 performs default setting processing. Nevertheless, because the default setting processing makes progress by the communication apparatus 151 receiving a user operation, a time taken from the start of the default setting processing to completion of it varies depending on the user who performs operations. Some users start operation of the information processing apparatus 101 for connection setting processing after the communication apparatus 151 completes default setting processing. In the present embodiment, the communication apparatus 151 starts operation in the connection setting mode before default setting processing is completed. Thus, when a user operation for default setting processing takes a long time to delay the completion of default setting processing performed by the communication apparatus 151, a connection setting mode elapse time counted so far sometimes becomes a large value at a timing at which the default setting processing is completed, which is an issue to be solved. In other words, after the default setting processing is completed, little time is sometimes left before the connection setting mode elapse time exceeds a timeout time.

In view of the foregoing, in the present embodiment, after default setting processing is completed, the timeout time for Setting Method 1 and the timeout time for Setting Method 2 are appropriately controlled. Specifically, in the present embodiment, each timeout time is controlled in accordance with the elapsed time of each setting method at the timing at which default setting processing is completed. By such control, even if the completion of default setting processing performed by the communication apparatus 151 gets delayed, a time enough for the user to perform an operation for connection setting processing can be left.

<Configuration of Operation Display Unit 160 of Communication Apparatus 151>

Figure 2B:
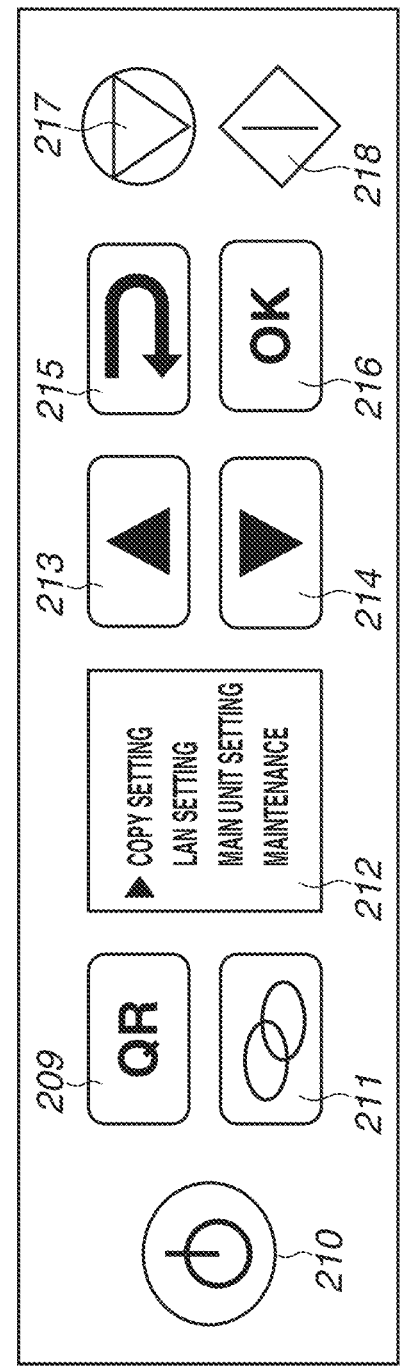

FIGS. 2A and 2B each schematically illustrate an example of a configuration of the operation display unit 160 of the communication apparatus 151.

In FIG. 2A, a panel 208 is a touch panel. The user can operate the communication apparatus 151 by touching the panel 208. A power button 201 is a physical button arranged near the panel 208. The user presses the power button 201 with the communication apparatus 151 in a software-off state to supply power to the entire communication apparatus 151, and then the communication apparatus 151 transitions to the software-on state. A software-off state is a state in which power is supplied to a minimum number of components of the communication apparatus 151 such as the CPU 154, but power is not supplied to the print engine 155 and a display unit included in the operation display unit 160, for example.

A software-on state is a state in which power is supplied to all the components of the communication apparatus 151 including the print engine 155 and the operation display unit 160.

In a case where the communication apparatus 151 transitions to the software-on state, a home screen in the uppermost hierarchy of menus operable by the user is displayed on the panel 208. The home screen includes a copy region 205 for receiving an execution instruction of copy processing, a scan region 206 for receiving an execution instruction of scan processing, and a print region 207 for receiving an execution instruction of print processing. The home screen also includes a state display region 202 indicating the setting and the connection state of infrastructure connection or direct connection of the communication apparatus 151, a connection setting mode region 203 for the user to start operation in the connection setting mode at a timing, and a setting region 204 for changing various settings.

FIG. 2B illustrates an example of a configuration of the operation display unit 160 including a display unit smaller than that in FIG. 2A. In this example, buttons 209 to 211 and 213 to 218 are physical buttons. The user presses the power button 210 to turn on the power of the communication apparatus 151.

In a case where the power of the communication apparatus 151 is turned on, a home screen in the uppermost hierarchy of menus operable by the user is displayed on a panel 212. The user can operate a cursor displayed on the panel 212, by pressing the operation buttons 213 and 214. If the user desires to perform an operation, the user presses the OK button 216. If the user desires to return to the previous menu screen, the user presses the return button 215. If the QR button 209 is pressed, the panel 212 can also display a quick response (QR) code (registered trademark) including information for directly connecting with the communication apparatus 151. In a case where the QR code is read from the information processing apparatus 101, the information processing apparatus 101 and the communication apparatus 151 directly connect with each other and become ready to wirelessly communicate with each other. In other words, information included in the QR code is connection information for connecting with the communication apparatus 151 operating in the direct connection mode. If the QR button 209 is pressed, the communication apparatus 151 starts to operate in the direct connection mode. If the connection setting mode button 211 is pressed, the communication apparatus 151 starts to operate in the connection setting mode. If the stop button 217 is pressed, the communication apparatus 151 stops the execution of various types of currently-ongoing processing. If the copy start button 218 is pressed, the communication apparatus 151 starts copy processing.

<Processing Performed by Each Apparatus in This System>

Figure 3A:
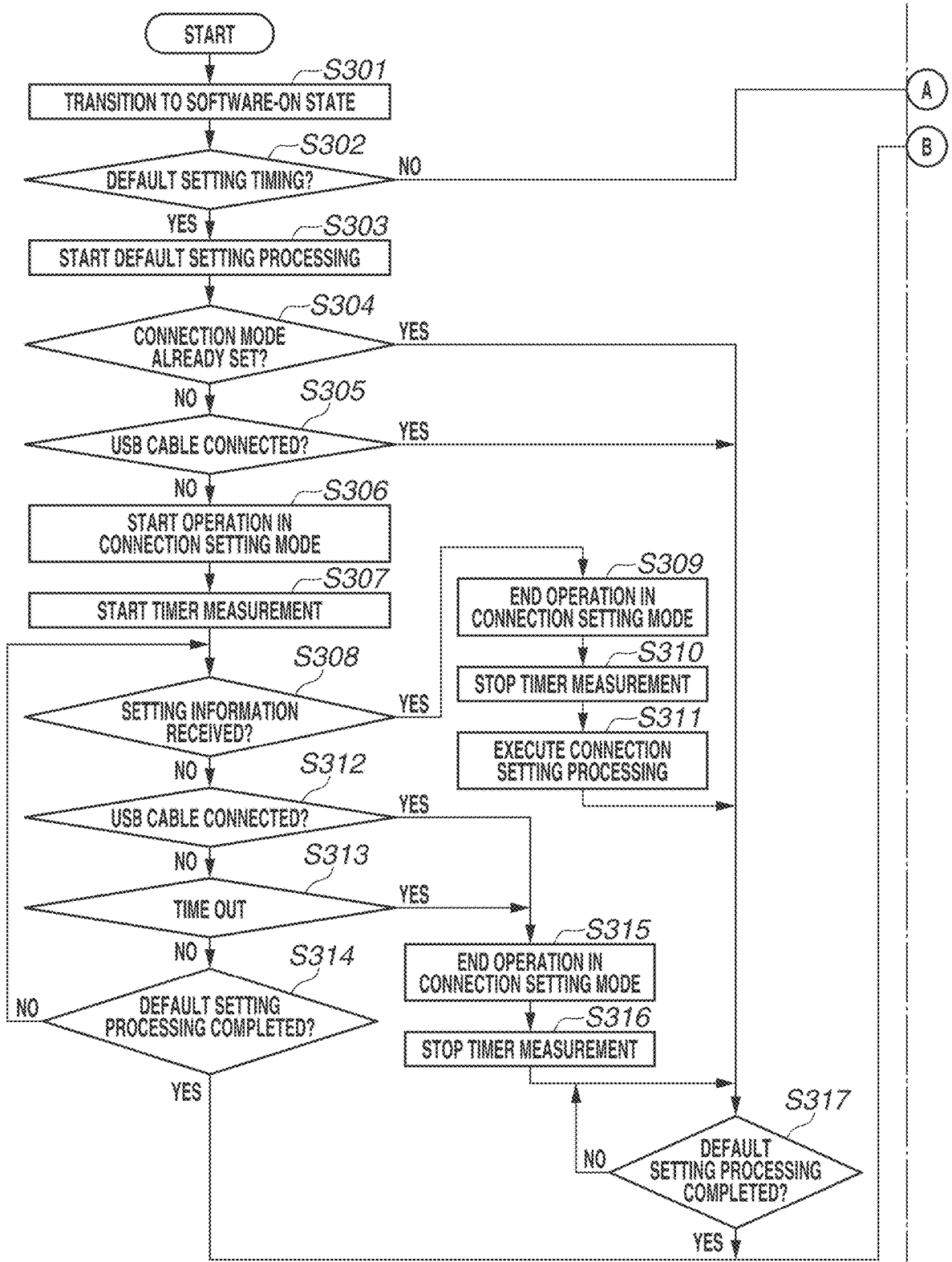
FIGS. 3A and 3B are a flowchart illustrating processing performed when the communication apparatus receives the press of a power button.
Figure 3B:
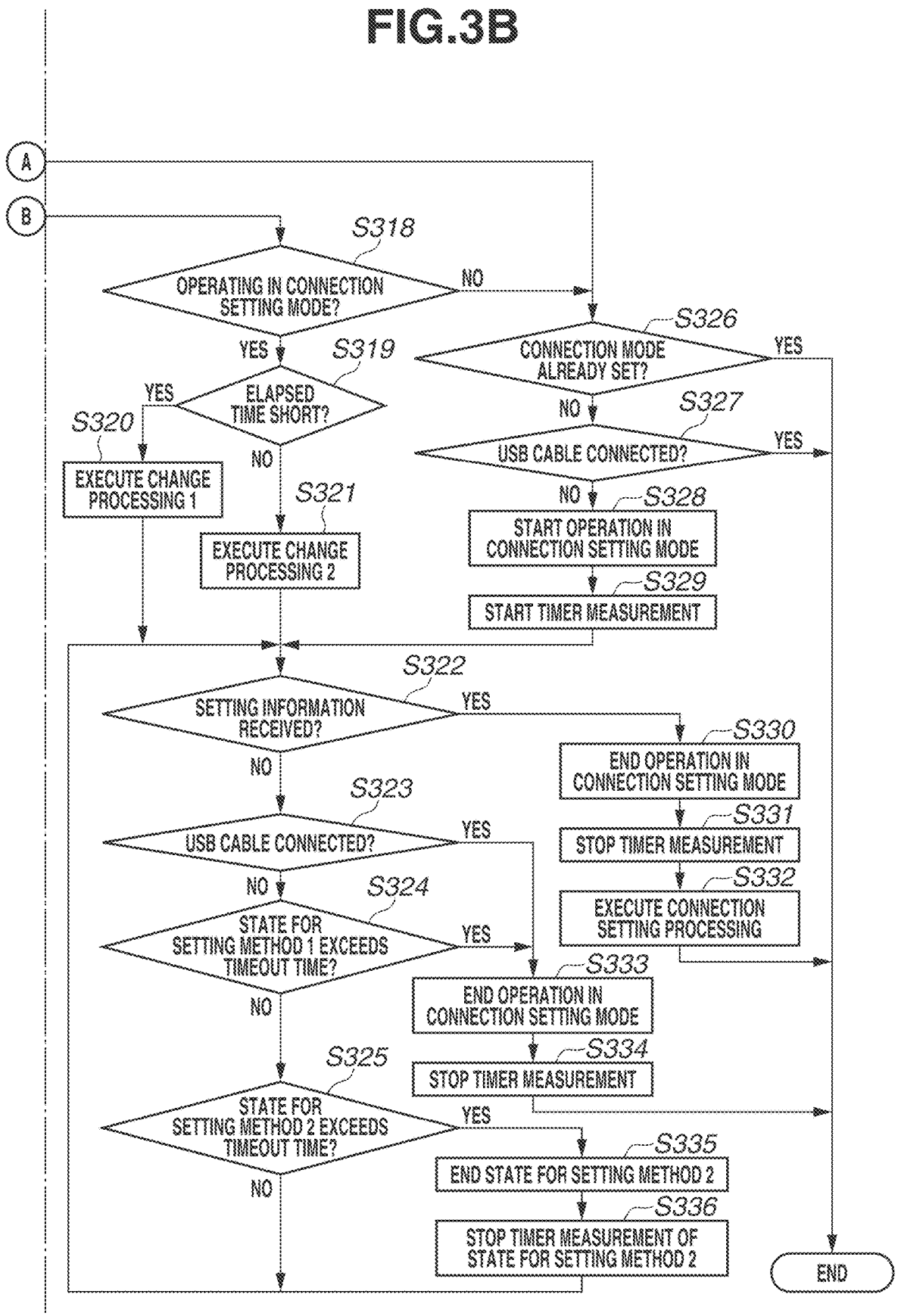

FIGS. 3A and 3B are a flowchart illustrating processing performed in a case where the communication apparatus 151 receives the press of a power button. The processing of the flowchart illustrated in FIGS. 3A and 3B is performed by the CPU 154 loading a program stored in the ROM 152 onto the RAM 153 and running the program, for example.

The processing of the flowchart illustrated in FIGS. 3A and 3B is started based on that the communication apparatus 151 in the software-off state receives, for example, the press of a power button from the user.

First of all, in step S301, the CPU 154 starts power supply generally to the communication apparatus 151, and causes the communication apparatus 151 to transition from the software-off state to the software-on state.

In step S302, the CPU 154 determines whether the timing is a default setting timing, referring to the information indicating whether the timing is a default setting timing that is stored in the RAM 153. Specifically, if the user activates the communication apparatus 151 (e.g. transition to the software-on state by the press of the power button) for the first time after the arrival of shipment, a default setting timing flag is set to ON in the RAM 153. On the other hand, if the communication apparatus 151 is activated after default setting processing is completed, and activated for the second time or another subsequent time, a default setting timing flag is set to OFF in the RAM 153. In short, the CPU 154 makes the determination in step S302 by referring to ON/OFF of the default setting timing flag. The determination may be made by determining whether the communication apparatus 151 has performed default setting processing in the past, for example. If the CPU 154 determines that the timing is a default setting timing (YES in step S302), the processing proceeds to step S303. Otherwise (NO in step S302), the processing proceeds to step S326. In the present embodiment, the processing in step S302 is performed using ON/OFF of the default setting timing flag, but information other than the flag may be used. In this case, information indicating that the timing is a default setting timing is stored in the RAM 153 at the arrival of shipment, for example.

If the CPU 154 determines that the timing is not a default setting timing (NO in step S302), the CPU 154 may end the processing of this flowchart without performing connection setting processing. Alternatively, at this time, the CPU 154 may display a user interface (UI) for asking the user whether to perform processing of setting a connection mode, and may perform control of determining whether to proceed to step S326 or end the processing of this flowchart, based on a response from the user.

If the CPU 154 determines that the timing is a default setting timing in step S302 (YES in step S302), default setting processing starts in step S303 to display a screen for default setting processing. If the CPU 154 determines that the timing is not a default setting timing in step S302 (NO in step S302), for example, the home screen is displayed. Even with NO in step S302, if the communication apparatus 151 starts an operation in the connection setting mode afterward, a connection setting mode screen may be displayed that indicates that the communication apparatus 151 is in the connection setting mode.

In step S303, the CPU 154 starts default setting processing. The processing in step S304 and subsequent steps is started without waiting for the completion of default setting processing, and is performed concurrently with the default setting processing started in step S303. The details of the default setting processing will be described with reference to FIG. 4.

Figure 4:
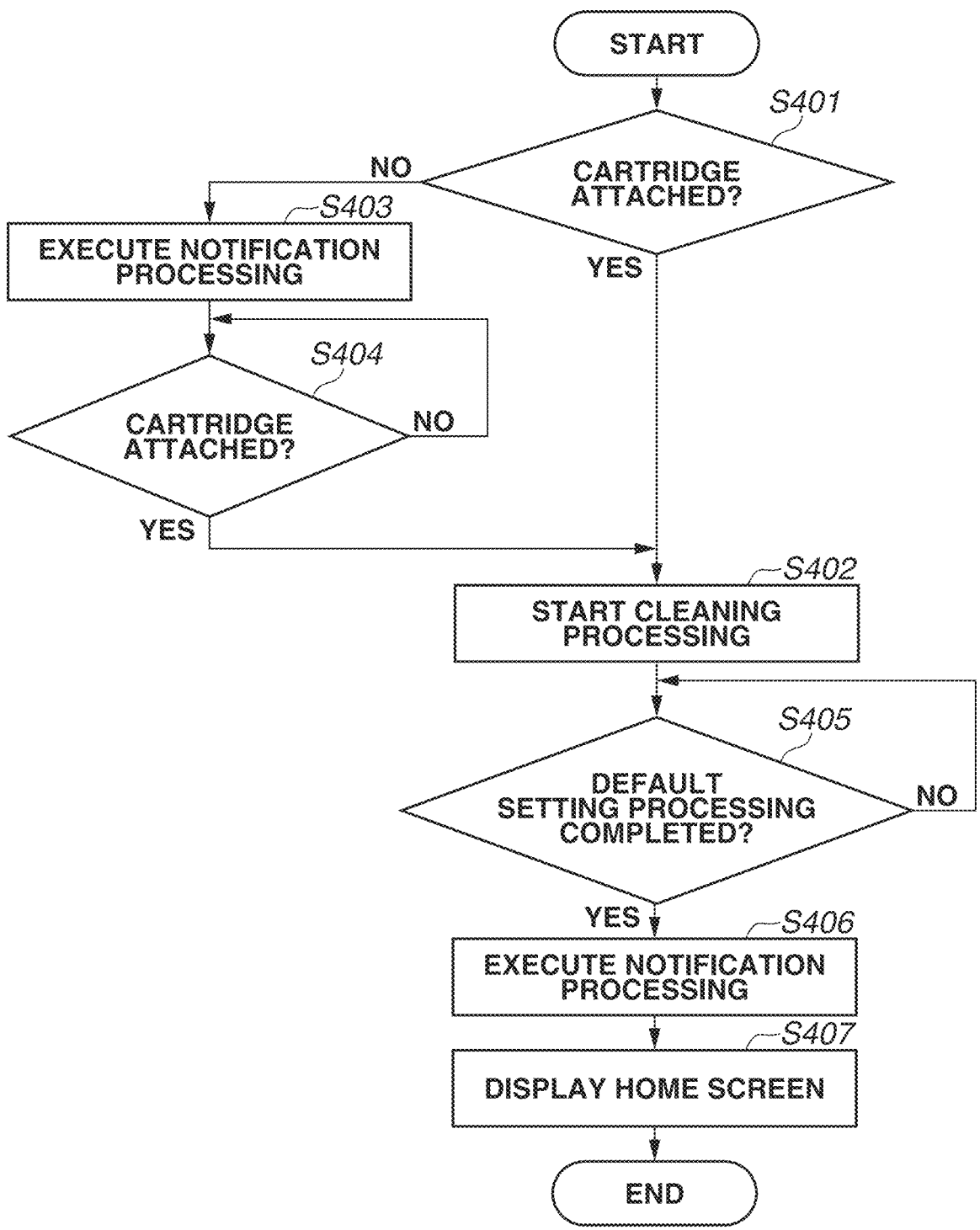
FIG. 4 is a flowchart illustrating default setting processing performed by the communication apparatus.

FIG. 4 is a flowchart illustrating default setting processing performed by the communication apparatus 151 according to the present embodiment. The processing of the flowchart illustrated in FIG. 4 is performed by the CPU 154 loading a program stored in the ROM 152 onto the RAM 153 and running the program, for example. The processing of the flowchart illustrated in FIG. 4 is started in a case where the processing in step S303 is performed.

In step S401, based on a detection result obtained by a detection unit (not illustrated) included in the communication apparatus 151, the CPU 154 determines whether an ink cartridge is attached to the communication apparatus 151. If a recording head and an ink tank are separated as components, the CPU 154 determines whether at least a recording head is attached to the communication apparatus 151. If the CPU 154 determines that an ink cartridge is attached to the communication apparatus 151 (YES in step S401), the processing proceeds to step S402. Otherwise (NO in step S401), the processing proceeds to step S403. An attachment of an ink cartridge or a recording head to the communication apparatus 151 is an operation to be performed by the user.

Thus, in step S403, the CPU 154 issues a notification regarding an ink cartridge to the user by blinking an LED of the operation display unit 160 or displaying a specific screen on the operation display unit 160. Specifically, the CPU 154 notifies the user that the communication apparatus 151 is in an ink cartridge attachment wait state, or the CPU 154 notifies the user of an attaching method for an ink cartridge. The method for the notification is not particularly limited. For example, the CPU 154 may issue a notification by voice using a speaker (not illustrated).

In step S404, based on a detection result obtained by the detection unit (not illustrated) included in the communication apparatus 151, the CPU 154 determines whether an ink cartridge is attached to the communication apparatus 151. Similarly to step S401, if a recording head and an ink tank are separated as components, the CPU 154 determines whether at least a recording head is attached to the communication apparatus 151. If the CPU 154 determines that an ink cartridge is attached to the communication apparatus 151 (YES in step S404), the processing proceeds to step S402. Otherwise (NO in step S404), the CPU 154 performs the processing in step S404 again. In the present embodiment, a timeout time is not set for the determination in step S404, and the determination in step S404 is repeated until an ink cartridge is attached by the user, or the communication apparatus 151 transitions to the software-off state. Thus, the longer time it takes for the user to properly complete attachment of an ink cartridge, the longer time it takes to complete the default setting processing. The CPU 154 may determine that an ink cartridge is attached to the communication apparatus 151 in step S404 if a skip operation for skipping the attachment of an ink cartridge is performed by the user. Alternatively, the CPU 154 may continuously issue a notification in step S403 until the CPU 154 determines that an ink cartridge is attached to the communication apparatus 151 in step S404.

In step S402, the CPU 154 starts default setting timing cleaning processing. Specifically, first of all, the CPU 154 moves the carriage to the position at which cleaning members such as the waste ink absorber and the capping mechanism that caps the discharge port of the recording head are provided.

After that, the CPU 154 caps the discharge port of the recording head using the capping mechanism, and actuates a pump connected to the capping mechanism. The CPU 154 thereby generates negative pressure in the capping mechanism, and sucks and discharges substances such as thicker ink and air bubbles from the discharge port. The CPU 154 thereby gets the ink in the discharge port back in good condition. Using a wiper, the CPU 154 then wipes ink on the discharge port surface of the recording head (wiping cleaning) by way of example. The cleaning processing is performed at a timing other than the default setting timing, such as a timing before printing start, a timing at which a predetermined time has elapsed since the previous printing, and a timing at which the communication apparatus 151 transitions to the software-on state after an abnormal end, for example. Such normal cleaning processing and the default setting timing cleaning processing may be different. Specifically, at the default setting timing, for the purpose of filling the flow channel from the head to the nozzle or from the ink tank to the head with ink, negative pressure suction power may be increased, the amount of suction may be increased, or the number of times of suction may be increased compared with those in the normal cleaning processing. Alternatively, the viscosity of ink in the recording head may be decreased by heating the ink.

In performing the default setting timing cleaning processing, the CPU 154 detects an error that is occurring in the communication apparatus 151. Examples of errors to be detected at this time include a head defectively-attached error and a carriage position error.

A head defectively-attached error is an error to be detected when an ink cartridge (recording head) is defectively attached to a carriage. For example, if an ink cartridge is defectively attached to a carriage, the ink cartridge sometimes protrudes toward a drive path of the carriage. In this case, when the carriage moves, the ink cartridge collides with a predetermined component provided inside the communication apparatus 151, and the carriage stops at the position of the predetermined component. For example, the CPU 154 detects the amount of the carriage's movement, and detects the occurrence of a head defectively-attached error if the detected amount of the movement reaches the amount of movement from a cartridge attached position to the position of the predetermined component. In addition, for example, if an ink cartridge is defectively attached to a carriage, the ink cartridge may come off the carriage during the movement of the carriage or during cleaning processing. The CPU 154 detects whether an ink cartridge is attached to a carriage using a cartridge sensor, for example. Then, if the cartridge sensor detects that an ink cartridge is not attached to a carriage during the movement of the carriage or during cleaning processing, the CPU 154 detects the occurrence of a head defectively-attached error. The head defectively-attached error is eliminated by the user opening the cover and properly attaching the ink cartridge again.

A carriage position error is an error to be detected when a foreign substance exists on the drive path of a carriage. For example, if foreign substances exist on the drive path of a carriage, they cause the amount of the carriage's movement to become smaller because they disturbs the movement of the carriage. The CPU 154 therefore detects the actual amount of the carriage's movement and the force (drive force) for driving the carriage, for example, and if the actual amount of the movement is smaller for the drive force, the CPU 154 detects the occurrence of a carriage position error. The carriage position error is eliminated by the user removing the substances.

If the CPU 154 detects an error, the CPU 154 performs error notification processing for notifying the user of the detected error. Specifically, for example, the CPU 154 displays a screen for notifying the user of the detected error, on the operation display unit 160. In a case where an error is detected with the communication apparatus 151 in connection with the information processing apparatus 101 by the connection setting processing being started, the CPU 154 transmits information for displaying the detected error on a display unit included in the information processing apparatus 101, to the information processing apparatus 101. The CPU 154 may be configured to perform error notification processing in a case where an inquiry is received from the information processing apparatus 101 connected with the communication apparatus 151.

In step S405, the CPU 154 determines whether the processes included in the default setting processing have been completed. If the processes included in the default setting processing have not been completed (NO in step S405), the CPU 154 repeats the processing in step S405 until the processes included in the default setting processing end. If the processes included in the default setting processing have been completed (YES in step S405), the processing proceeds to step S406. If the above-described error occurs, the default setting processing includes processing of detecting the clearance of the error. Thus, with an error cleared by a user operation, it is determined that one of the processes included in the default setting processing has been completed. In the present embodiment, as described above, the default setting processing includes processing of detecting that an ink cartridge is attached, and the default setting timing cleaning processing. Nevertheless, the default setting processing is not limited to this processing. For example, the default setting processing may include the reception of a user operation for setting a language to be used for display by the communication apparatus 151, the reception of a user operation for making an answer to a questionnaire about the environment in which the communication apparatus 151 is used, and registration adjustment. The order in which the processes included in the default setting processing are performed is not particularly limited.

If the CPU 154 determines that the processes included in the default setting processing have been completed in step S405 (YES in step S405), the CPU 154 changes information indicating whether the timing is a default setting timing in such a manner as to indicate that the timing at which the communication apparatus 151 transitions to the software-on state next time or later is not a default setting timing. Specifically, the CPU 154 changes the ON/OFF of the default setting timing flag. The change timing of the information indicating whether the timing is a default setting timing is not limited to this timing. The information may be changed at any timing as long as the change timing is later than the determination as to whether the timing is a default setting timing.

In step S406, the CPU 154 issues a notification indicating that the default setting processing has been completed to the user by blinking an LED of the operation display unit 160 or displaying a specific screen on the operation display unit 160. Specifically, for example, the CPU 154 displays on the operation display unit 160 a screen indicating to the user that the default setting processing has been completed. The method for the notification is not particularly limited. For example, the CPU 154 may issue a notification by voice using a speaker (not illustrated).

In step S407, the CPU 154 displays the home screen on the operation display unit 160.

After that, the CPU 154 ends the processing of this flowchart.

As described above, to complete the default setting processing, the user performs operations such as the attachment of an ink cartridge. If the user has just unpacked the communication apparatus 151, the user also removes the packing materials of the communication apparatus 151. Thus, various user operations are performed in completing the default setting processing. The time taken to complete the default setting processing therefore varies among users.

The description will return to FIGS. 3A and 3B.

In step S304, the CPU 154 determines whether the communication apparatus 151 has already been set to any connection mode. The communication apparatus 151 may be settable to a connection mode other than the above-described direct connection mode and the infrastructure connection mode. For example, the communication apparatus 151 may be settable to a wired LAN connection mode. A wired LAN connection mode is a mode for connecting with a different apparatus via a wired LAN. In the present embodiment, with the communication apparatus 151 set to the wired LAN connection mode, the direct connection mode and the infrastructure connection mode cannot be set, and the communication apparatus 151 cannot perform wireless LAN communication (communication in compliance with an IEEE 802.11 series communication standard). The communication apparatus 151 may be preset to the wired LAN connection mode even if a wired LAN is not connected to the communication apparatus 151. In this step, the CPU 154 may further determine whether the communication apparatus 151 has ever connected with an external access point in the infrastructure connection mode before. Specifically, the communication apparatus 151 stores information regarding an external access point connected in the past into a predetermined storage region. Then, if information regarding an external access point connected in the past is stored in the predetermined storage region, the CPU 154 determines that the communication apparatus 151 has ever connected with an external access point before. If information regarding an external access point connected in the past is not stored in the predetermined storage region and a default value is stored in the predetermined storage region, the CPU 154 determines that the communication apparatus 151 has never connected with an external access point before. Information stored in a predetermined storage region may be reset to a default value by a reset operation as an operation for resetting a connection setting of the communication apparatus 151 performed on the communication apparatus 151 and as an operation different from the press of a power button. If a reset operation is performed, the communication apparatus 151 resets a connection mode to which the communication apparatus 151 is set, and returns to a state in which any connection mode is unset. Then, if the CPU 154 determines that the communication apparatus 151 has already been set to any connection mode (YES in step S304), that means that the communication apparatus 151 has already been set to a connection mode (or the communication apparatus 151 has ever set to a connection mode). Thus, if the CPU 154 determines that the communication apparatus 151 has already been set to any connection mode (YES in step S304), the CPU 154 determines that connection setting processing is not to be performed, and advances the processing to step S317 without causing the communication apparatus 151 to start operation in the connection setting mode. On the other hand, if the CPU 154 determines that the communication apparatus 151 has not been set to any connection mode (NO in step S304), the processing proceeds to step S305.

In step S305, the CPU 154 determines whether a USB cable is connected to the communication apparatus 151. If a USB cable is connected (YES in step S305), the communication apparatus 151 is highly likely to perform communication with a different apparatus not via a wireless network but via the USB cable. Thus, if the CPU 154 determines that a USB cable is connected to the communication apparatus 151 (YES in step S305), the CPU 154 determines that connection setting processing is not to be performed, and advances the processing to step S317 without causing the communication apparatus 151 to start operation in the connection setting mode. In this step, the CPU 154 determines whether a USB cable is connected. Alternatively, the CPU 154 may determine whether a wired LAN cable is connected. Alternatively, the CPU 154 may determine both whether a USB cable is connected and whether a wired LAN cable is connected. If it is determined that a wired LAN cable is connected, the communication apparatus 151 may be set to the wired LAN connection mode. On the other hand, if the CPU 154 determines that a USB cable is not connected to the communication apparatus 151 (NO in step S305), the processing proceeds to step S306.

In step S306, the CPU 154 causes the communication apparatus 151 to start operation in the connection setting mode. More specifically, the communication apparatus 151 automatically starts operation in the connection setting mode after the press of the power button without operating the connection setting mode region 203 or the connection setting mode button 211.

At this time, the CPU 154 may display on the operation display unit 160 a screen indicating a started state of the connection setting mode. In the present embodiment, at this time, operation in the state for Setting Method 1 and operation in the state for Setting Method 2 are simultaneously started.

In step S307, the CPU 154 starts timer measurement for measuring (counting) the elapsed time of the state for Setting Method 1 and the elapsed time of the state for Setting Method 2, and waits for setting information to be transmitted from the information processing apparatus 101. In the present embodiment, the value counted by the timer measurement is incremented every minute that has elapsed, and is a value counted by minutes, but the counting is not limited to this example. For example, the counted value may be a value counted by seconds that is incremented every second that has elapsed. Then, in step S308, the CPU 154 determines whether setting information has been received from the information processing apparatus 101. The method of receiving setting information may be Setting Method 1 or Setting Method 2.

If the CPU 154 determines that setting information has been received from the information processing apparatus 101 in step S308 (YES in step S308), the processing proceeds to step S309. In step S309, the CPU 154 causes the communication apparatus 151 to end the operation in the connection setting mode. More specifically, the operation in the state for Setting Method 1 and the operation in the state for Setting Method 2 are ended as well. Then, in step S310, the CPU 154 stops both the timer measurement for measuring the elapsed time of the state for Setting Method 1 and the timer measurement for measuring the elapsed time of the state for Setting Method 2. In a case where the connection setting mode is ended in a state in which connection between the information processing apparatus 101 and the communication apparatus 151 is established by the AP dedicated for the connection setting mode, the connection between the information processing apparatus 101 and the communication apparatus 151 is disconnected. Then, in step S311, the CPU 154 performs connection setting processing on the communication apparatus 151 based on the received setting information. In other words, the CPU 154 sets a connection mode based on the received setting information. The connection setting processing on the communication apparatus 151 will be described in detail below.

If information (AP information, etc.) corresponding to the infrastructure connection mode has been received as setting information, the CPU 154 in the connection setting processing registers the AP corresponding to the setting information into the RAM 153 as an AP to be used in the infrastructure connection mode, and connects the AP and the communication apparatus 151. If a cryptography key is used for the AP, the CPU 154 registers the cryptography key. Then, if the registration and connection of the AP appropriately end, the CPU 154 sets the communication apparatus 151 to the infrastructure connection mode in which communication can be performed via the registered AP. The communication apparatus 151 thereby operates in a state in which wireless connection with the information processing apparatus 101 can be established via the registered AP. Alternatively, if information corresponding to the WFD mode or the soft AP mode has been received as setting information, the CPU 154 transmits connection information for connecting with an AP corresponding to the WFD mode or the soft AP mode to the information processing apparatus 101 before causing the communication apparatus 151 to end the operation in the connection setting mode. Thus, if information corresponding to the WFD mode or the soft AP mode has been received as setting information, the CPU 154 causes the communication apparatus 151 to end the operation in the connection setting mode, then activates the AP corresponding to the WFD mode or the soft AP mode, and sets the communication apparatus 151 to the WFD mode or the soft AP mode. If a connection request including connection information transmitted before the end of the connection setting mode has been received in this state from the information processing apparatus 101 as a transmission source of the setting information, the CPU 154 connects the communication apparatus 151 and the information processing apparatus 101 using a P2P method. The communication apparatus 151 thereby operates in a state in which P2P wireless connection with the information processing apparatus 101 can be established. After the connection setting processing is completed, the CPU 154 advances the processing to step S317.

The connection setting processing is not limited to the above-described processing. For example, depending on setting information received from the information processing apparatus 101, setting of the infrastructure connection mode may be made without making setting of the direct connection mode. For example, if information (AP information, etc.) corresponding to the infrastructure connection mode has been received as setting information, the communication apparatus 151 is set to the infrastructure connection mode, and the communication apparatus 151 may also be simultaneously set to the WFD mode or the soft AP mode.

On the other hand, if the CPU 154 determines that setting information has not been received from the information processing apparatus 101 in step S308 (NO in step S308), the processing proceeds to step S312. In step S312, the CPU 154 determines whether a USB cable is connected to the communication apparatus 151. The determination is performed because, after the communication apparatus 151 starts an operation in the connection setting mode, the user sometimes connects a USB cable to the communication apparatus 151 for using the communication apparatus 151 via USB communication. The details of the processing is similar to the processing in step S305. If the CPU 154 determines that a USB cable is connected to the communication apparatus 151 in step S312 (YES in step S312), the processing proceeds to step S315. In step S315, the CPU 154 causes the communication apparatus 151 to end the operation in the connection setting mode. In step S316, the CPU 154 stops timer measurement. After that, the CPU 154 advances the processing to step S317.

On the other hand, if the CPU 154 determines that a USB cable is not connected to the communication apparatus 151 in step S312 (NO in step S312), the processing proceeds to step S313. In step S313, the CPU 154 determines whether each elapsed time measured by timer measurement has exceeded the corresponding timeout time. As the state for Setting Method 1 and the state for Setting Method 2 are simultaneously started, the two elapsed times are the same at the time point. In the present embodiment, before being changed by timeout time change processing to be described below, both the original timeout times for Setting Method 1 and Setting Method 2 are set to 60 minutes. Nevertheless, the timeout times are not limited to the value used in this configuration, and any value may be used. If the CPU 154 determines that each elapsed time measured by timer measurement has exceeded the corresponding timeout time (YES in step S313), the processing proceeds to step S315. If the CPU 154 determines that each elapsed time measured by timer measurement has not exceeded the corresponding timeout time (NO in step S313), the processing proceeds to step S314.

In step S314, the CPU 154 determines whether the default setting processing has been completed. The completion of the default setting processing has been described above with reference to FIG. 4. If the CPU 154 determines that the default setting processing has not been completed (NO in step S314), the CPU 154 waits for setting information to be transmitted from the information processing apparatus 101, and the processing returns to step S308. On the other hand, if the CPU 154 determines that the default setting processing has been completed (YES in step S314), the processing proceeds to step S318.

In step S317, similarly to step S314, the CPU 154 determines whether the default setting processing has been completed. If the CPU 154 determines that the default setting processing has not been completed (NO in step S317), the CPU 154 waits for the default setting processing to be completed, and performs the processing in step S317 again. On the other hand, if the CPU 154 determines that the default setting processing has been completed (YES in step S317), the processing proceeds to step S318.

In step S318, the CPU 154 determines whether the communication apparatus 151 is operating in the connection setting mode. If the CPU 154 determines that the communication apparatus 151 is operating in the connection setting mode (YES in step S318), the processing proceeds to step S319. If the CPU 154 determines that the communication apparatus 151 is not operating in the connection setting mode (NO in step S318), the processing proceeds to step S326. The case where the CPU 154 determines that the communication apparatus 151 is operating in the connection setting mode is a case where the default setting processing has been completed under the condition that the state for Setting Method 1 and the state for Setting Method 2 have not reached the respective timeout times (a case where the CPU 154 determines that the default setting processing has been completed in step S314). The case where the CPU 154 determines that the communication apparatus 151 is not operating in the connection setting mode is a case where the default setting processing has been completed after the state for Setting Method 1 and the state for Setting Method 2 have reached the respective timeout times, or the default setting processing has been completed without start of operation in the connection setting mode (a case where the CPU 154 determines that the default setting processing has been completed in step S317), for example.

In step S319, the CPU 154 determines whether each elapsed time measured by timer measurement is short. The processing can be rephrased as processing of determining whether the remaining time before the state for Setting Method 1 and the state for Setting Method 2 end due to timeout is long. Specifically, the CPU 154 determines whether a value obtained by subtracting the elapsed time of the state for Setting Method 1 from the timeout time for Setting Method 1 is smaller than a predetermined threshold value. In the present embodiment, the predetermined threshold value used in the determination is set to 15 minutes, but the predetermined threshold value is not limited to the value used in this configuration, and any value may be used. Alternatively, for example, it may be determined in the determination whether the elapsed time of the state for Setting Method 1 is longer than a certain threshold value. In this step, the determination is made referring to the timeout time for Setting Method 1 and the elapsed time of the state for Setting Method 1. The timeout time for Setting Method 1 and the timeout time for Setting Method 2 are the same at the time point. The elapsed time of the state for Setting Method 1 and the elapsed time of the state for Setting Method 2 are the same as well. Thus, the determination may be performed referring to the timeout time for Setting Method 2 and the elapsed time of the state for Setting Method 2.

If the CPU 154 determines that each elapsed time measured by timer measurement is short (YES in step S319), enough time is left before the state for Setting Method 1 and the state for Setting Method 2 end due to timeout. The processing therefore proceeds to step S320, in which the CPU 154 performs timeout time change processing 1. The processing is processing of changing the timeout time for Setting Method 2 to a timeout time smaller than the original timeout time. In this step, the timeout time for Setting Method 1 is not changed. The timeout time for Setting Method 2 is changed to a timeout time smaller than the timeout time for Setting Method 1. Furthermore, the timeout time for Setting Method 2 is changed to a time longer than the elapsed time of the state for Setting Method 2. Specifically, for example, if the original timeout time for Setting Method 2 is 60 minutes and the elapsed time of the state for Setting Method 2 is 30 minutes, the CPU 154 changes the timeout time for Setting Method 2 to 45 minutes. At this time, the timeout time for Setting Method 2 is changed by subtracting a predetermined value from the original value, for example. The value to be subtracted may be a fixed value, or may be a value varying depending on the elapsed time of the state for Setting Method 2.

Alternatively, the timeout time for Setting Method 2 may be changed to a value obtained by adding a predetermined value to the elapsed time of the state for Setting Method 2, for example. The value to be added may be a fixed value, or may be a value varying depending on the elapsed time of the state for Setting Method 2. The processing is performed to control the remaining time before the state for Setting Method 2 ends due to timeout to become shorter. Thus, for example, the processing is not limited to the processing of changing the timeout time for Setting Method 2, and may be processing of changing the elapsed time of the state for Setting Method 2 in such a manner as to prolong the remaining time before the state for Setting Method 2 ends due to timeout. More specifically, for example, the elapsed time of the state for Setting Method 2 may be changed in such a manner that a value obtained by subtracting the elapsed time of the state for Setting Method 2 from the timeout time for Setting Method 2 becomes a predetermined value. In this configuration, specifically, for example, if the original timeout time for Setting Method 2 is 60 minutes and the original elapsed time of the state for Setting Method 2 is 30 minutes, the elapsed time of the state for Setting Method 2 is changed to 45 minutes. Alternatively, for example, the change processing may be processing of changing the elapsed time of the state for Setting Method 2 in such a manner as to become longer than the original elapsed time, without changing the elapsed time based on the timeout time for Setting Method 2. At this time, for example, a certain value is added to the elapsed time of the state for Setting Method 2. The value to be added at this time may be a fixed value, or may be a value varying depending on the elapsed time of the state for Setting Method 2. Alternatively, for example, both the timeout time for Setting Method 2 and the elapsed time of the state for Setting Method 2 may be changed. After that, the CPU 154 advances the processing to step S322.

On the other hand, if the CPU 154 determines that each elapsed time measured by timer measurement is not short (NO in step S319), little remaining time is left before the state for Setting Method 1 and the state for Setting Method 2 end due to timeout. The processing therefore proceeds to step S321, in which the CPU 154 performs timeout time change processing 2. Specifically, the processing is processing of changing the timeout time for Setting Method 1 in such a manner that a value obtained by subtracting the elapsed time of the state for Setting Method 1 from the timeout time for Setting Method 1 becomes a predetermined value, for example. The predetermined value is set to 15 minutes, for example, but the predetermined value is not limited to the value used in this configuration, and any value may be used. In this configuration, specifically, for example, if the timeout time for Setting Method 1 is 60 minutes and the elapsed time of the state for Setting Method 1 is 50 minutes, the timeout time for Setting Method 1 is changed to 65 minutes. Alternatively, for example, the processing may be processing of changing the timeout time for Setting Method 1 in such a manner as to become longer than the original timeout time, without changing the timeout time based on the elapsed time of the state for Setting Method 1. At this time, for example, a value is added to the timeout time for Setting Method 1. The value to be added may be a fixed value, or may be a value varying depending on the elapsed time of the state for Setting Method 1. At this time, the timeout time for Setting Method 2 is also changed similarly to the timeout time for Setting Method 1. The processing is performed to control the remaining time before the state for Setting Method 1 and the state for Setting Method 2 end due to timeout to become longer. Thus, for example, the processing is not limited to the processing of changing the timeout time, and may be processing of changing the elapsed time in such a manner as to prolong the remaining time before the state for Setting Method 1 and the state for Setting Method 2 end due to timeout. More specifically, for example, the elapsed time of the state for Setting Method 1 may be changed in such a manner that a value obtained by subtracting the elapsed time of the state for Setting Method 1 from the timeout time for Setting Method 1 becomes a predetermined value. In this configuration, specifically, for example, if the timeout time for Setting Method 1 is 60 minutes and the elapsed time of the state for Setting Method 1 is 50 minutes, the elapsed time of the state for Setting Method 1 is changed to 45 minutes. Alternatively, for example, the change processing may be processing of changing the elapsed time of the state for Setting Method 1 in such a manner as to become smaller than the original elapsed time, without changing the elapsed time based on the timeout time for Setting Method 1. At this time, for example, a certain value is subtracted from the elapsed time of the state for Setting Method 1. The value to be subtracted at this time may be a fixed value, or may be a value varying depending on the elapsed time of the state for Setting Method 1. Alternatively, for example, the change processing may be processing of resetting the elapsed time of the state for Setting Method 1 (setting the elapsed time to 0). At this time, the elapsed time of the state for Setting Method 2 is also changed similarly to the elapsed time of the state for Setting Method 1. Alternatively, for example, both the timeout time for Setting Method 1 and the elapsed time of the state for Setting Method 1 may be changed. In this configuration, specifically, for example, if the timeout time for Setting Method 1 is 60 minutes and the elapsed time of the state for Setting Method 1 is 50 minutes, the elapsed time of the state for Setting Method 1 is reset and the timeout time for Setting Method 1 is changed to 15 minutes. In this manner, in the configuration in which both the timeout time and the elapsed time are changed, the timeout time may be changed in such a manner as to become smaller than the original value. At this time, the timeout time for Setting Method 2 and the elapsed time of the state for Setting Method 2 are also changed similarly to the timeout time for Setting Method 1 and the elapsed time of the state for Setting Method 1.

After that, the CPU 154 advances the processing to step S322.

In step S326 performed when the CPU 154 determines that the timing is not a default setting timing in step S302 or the CPU 154 determines that the communication apparatus 151 is not operating in the connection setting mode in step S318, the CPU 154 determines whether the communication apparatus 151 has already been set to any connection mode. The details of the processing is similar to the processing in step S304. If the CPU 154 determines that the communication apparatus 151 has already been set to any connection mode (YES in step S326), the CPU 154 ends the processing of this flowchart without causing the communication apparatus 151 to start operation in the connection setting mode. On the other hand, if the CPU 154 determines that the communication apparatus 151 has not been set to any connection mode (NO in step S326), the processing proceeds to step S327.

In step S327, the CPU 154 determines whether a USB cable is connected to the communication apparatus 151. The details of the processing is similar to the processing in step S305. If the CPU 154 determines that a USB cable is connected to the communication apparatus 151 (YES in step S327), the CPU 154 ends the processing of this flowchart without causing the communication apparatus 151 to start operation in the connection setting mode. On the other hand, if the CPU 154 determines that a USB cable is not connected to the communication apparatus 151 (NO in step S327), the processing proceeds to step S328.

In step S328, the CPU 154 causes the communication apparatus 151 to start operation in the connection setting mode. The details of the processing is similar to the processing in step S306.

In step S329, the CPU 154 starts timer measurement for measuring a connection setting mode elapse time, and waits for setting information to be transmitted from the information processing apparatus 101. The details of the processing is similar to the processing in step S307. After that, the CPU 154 advances the processing to step S322.

In step S322, the CPU 154 determines whether setting information has been received from the information processing apparatus 101. If the CPU 154 determines that setting information has been received from the information processing apparatus 101 (YES in step S322), the processing proceeds to step S330. If the CPU 154 determines that setting information has not been received from the information processing apparatus 101 (NO in step S322), the processing proceeds to step S323.

The details of the processing in steps S330 to S332 is similar to the processing in steps S309 to S311. After the processing in step S332, the CPU 154 ends the processing of this flowchart.

In step S323, the CPU 154 determines whether a USB cable is connected to the communication apparatus 151. The details of the processing is similar to the processing in step S312. If the CPU 154 determines that a USB cable is connected to the communication apparatus 151 (YES in step S323), the processing proceeds to step S333. If the CPU 154 determines that a USB cable is not connected to the communication apparatus 151 (NO in step S323), the processing proceeds to step S324.

In step S324, the CPU 154 determines whether the elapsed time of the state for Setting Method 1 that has been measured by timer measurement has exceeded the timeout time for Setting Method 1. At this time, if the timeout time for Setting Method 1 has been changed in step S321, the determination is made based on the changed timeout time. If the CPU 154 determines that the elapsed time of the state for Setting Method 1 that has been measured by timer measurement has exceeded the timeout time for Setting Method 1 (YES in step S324), the processing proceeds to step S333. If the CPU 154 determines that the elapsed time of the state for Setting Method 1 that has been measured by timer measurement has not exceeded the timeout time for Setting Method 1 (NO in step S324), the processing proceeds to step S325.

The details of the processing in steps S333 and S334 is similar to the processing in steps S315 and S316. After the processing in step S334, the CPU 154 ends the processing of this flowchart.

In step S325, the CPU 154 determines whether the elapsed time of the state for Setting Method 2 that has been measured by timer measurement has exceeded the timeout time for Setting Method 2. At this time, if the timeout time for Setting Method 2 has been changed in step S320 or S321, the determination is made based on the changed timeout time. If the CPU 154 determines that the elapsed time of the state for Setting Method 2 that has been measured by timer measurement has exceeded the timeout time for Setting Method 2 (YES in step S325), the processing proceeds to step S335. If the CPU 154 determines that the elapsed time of the state for Setting Method 2 that has been measured by timer measurement has not exceeded the timeout time for Setting Method 2 (NO in step S325), the processing returns to step S322.

In step S335, the CPU 154 causes the communication apparatus 151 to end the operation in the state for Setting Method 2. At this time, because the elapsed time of the state for Setting Method 1 has not exceeded the timeout time for Setting Method 1, the operation in the state for Setting Method 1 is continued.

In step S336, the CPU 154 stops timer measurement for measuring the elapsed time of the state for Setting Method 2. At this time, the CPU 154 does not stop timer measurement for measuring the elapsed time of the state for Setting Method 1. After that, the CPU 154 returns the processing to step S322.

As described above, in the present embodiment, if little remaining time before the operation in the connection setting mode ends after the completion of the default setting processing is left due to a long time taken to complete the default setting processing (if the CPU 154 determines that each elapsed time measured by timer measurement is not short in step S319), the timeout time is prolonged. The user can thereby establish the connection between the information processing apparatus 101 and the communication apparatus 151 with time to spare, and set the communication apparatus 151 to a connection mode with time to spare. In the present embodiment, if the connection setting mode is started without start of the default setting processing (if the processing in step S328 is performed after the CPU 154 determines that the timing is not a default setting timing in step S302), neither the timeout time for Setting Method 1 nor the timeout time for Setting Method 2 is prolonged.

In this manner, in the present embodiment, if a lot of remaining time before the operation in the connection setting mode ends is left after the completion of the default setting processing due to less time taken to complete the default setting processing (if the CPU 154 determines that each elapsed time measured by timer measurement is short in step S319), the timeout time for Setting Method 2 is shortened. This can prevent the state for Setting Method 2, which is a state of using Setting Method 2 in which setting is highly likely to take less time, from being continued for a time longer than necessary, and the security regarding the connection of the communication apparatus 151 can be secured. In the present embodiment, for example, if a lot of remaining time before the operation in the connection setting mode ends is left after the completion of the default setting processing (if the CPU 154 determines that each elapsed time measured by timer measurement is short in step S319), the timeout time for Setting Method 1 is not changed. The user can thereby establish the connection between the information processing apparatus 101 and the communication apparatus 151 with time to spare in using Setting Method 1 in which setting might take a long time. In addition, for example, if the connection setting mode is started without start of the default setting processing (if the processing in step S328 is performed after the CPU 154 determines that the timing is not a default setting timing in step S302), neither the timeout time for Setting Method 1 nor the timeout time for Setting Method 2 is shortened.

Figure 5:
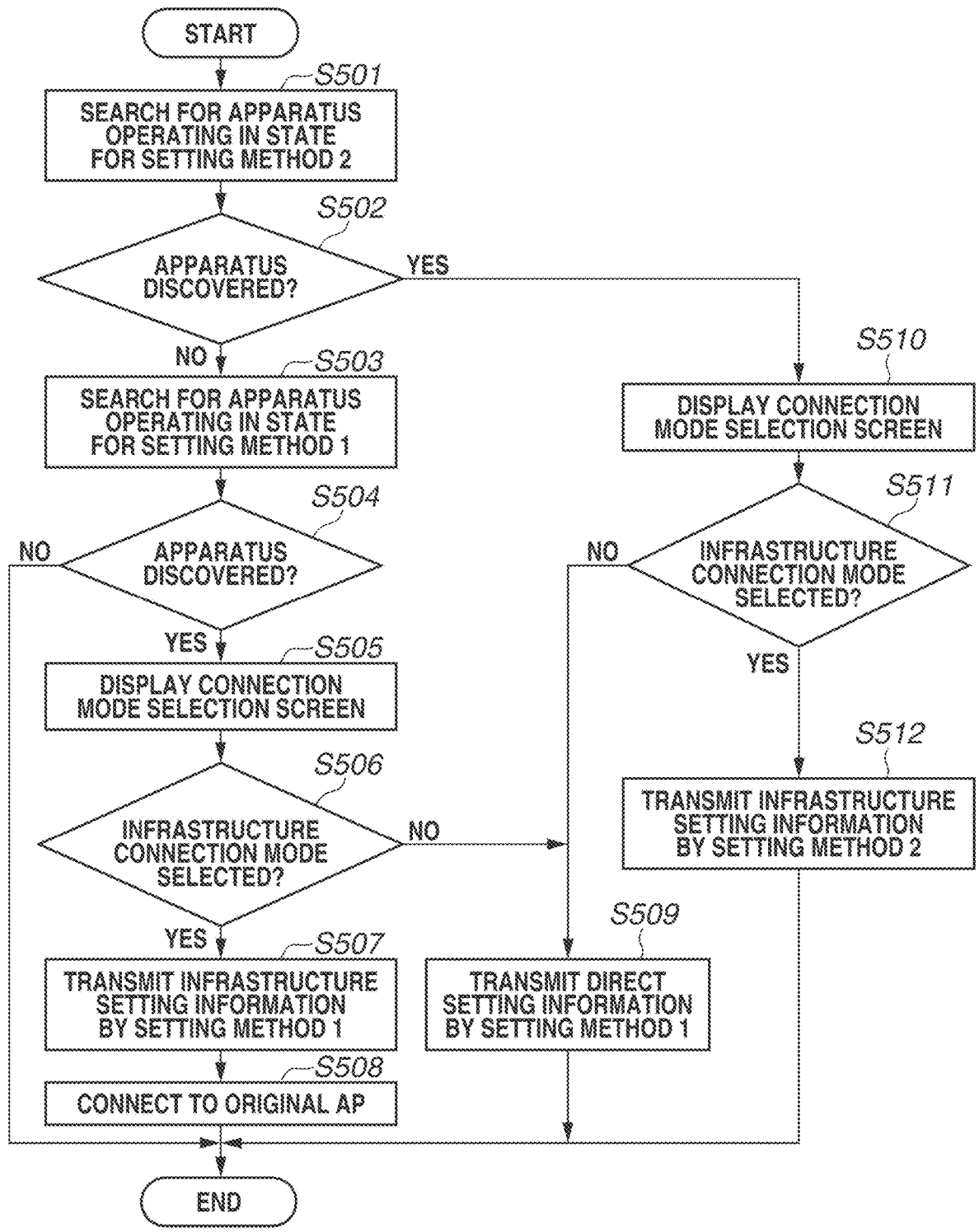
FIG. 5 is a flowchart illustrating processing performed by the information processing apparatus to cause the communication apparatus to perform connection setting processing.

FIG. 5 is a flowchart illustrating processing performed by the information processing apparatus 101 to cause the communication apparatus 151 to perform connection setting processing. The processing of the flowchart is performed by the CPU 103 loading a setup program for the communication apparatus 151 that is stored in the ROM 104 or an external storage device (not illustrated) onto the RAM 105, and running the setup program for the communication apparatus 151. The processing of the flowchart is started by a setting instruction being received from the user on a screen displayed by the setup program for the communication apparatus 151.

First of all, in step S501, the CPU 103 searches for an apparatus operating in the state for Setting Method 2. As described above, an apparatus operating in the state for Setting Method 2 transmits a predetermined beacon. Thus, by searching for the predetermined beacon transmitted by an apparatus operating in the state for Setting Method 2, for example, the CPU 103 searches for an apparatus operating in the state for Setting Method 2.

In step S502, the CPU 103 determines whether an apparatus operating in the state for Setting Method 2 has been discovered (determines whether a predetermined beacon has been received) in the searching in step S501. If the CPU 103 determines that an apparatus operating in the state for Setting Method 2 has been discovered (YES in step S502), the processing proceeds to step S510. If the CPU 103 determines that an apparatus operating in the state for Setting Method 2 has not been discovered (NO in step S502), the processing proceeds to step S503. It is assumed that if the CPU 103 determines that an apparatus operating in the state for Setting Method 2 has been discovered (YES in step S502), the communication apparatus 151 is discovered as the apparatus operating in the state for Setting Method 2.

In step S503, the CPU 103 searches for an apparatus operating in the state for Setting Method 1. As described above, the communication apparatus 151 operating in a connection setting mode activates the soft AP dedicated for the connection setting mode. Thus, by searching for the beacon transmitted by the soft AP dedicated for the connection setting mode that has been activated by the communication apparatus 151 operating in the state for Setting Method 1, for example, the CPU 103 searches for an apparatus operating in the state for Setting Method 1.

In step S504, the CPU 103 determines whether an apparatus operating in the state for Setting Method 1 has been discovered in the searching in step S503. If the CPU 103 determines that an apparatus operating in the state for Setting Method 1 has been discovered (YES in step S504), the processing proceeds to step S505. If the CPU 103 determines that an apparatus operating in the state for Setting Method 1 has not been discovered (NO in step S504), the CPU 103 ends the processing of this flowchart. If the CPU 154 determines that an apparatus operating in the state for Setting Method 1 has not been discovered (NO in step S504), for example, the CPU 103 may display an instruction manual indicating a method for causing the communication apparatus 151 to perform connection setting processing.

In step S505, the CPU 103 displays a connection mode selection screen for selecting a connection mode for the communication apparatus 151. Then, the CPU 103 selects a connection mode corresponding to the entry received from the user on the connection mode selection screen as a connection mode for the communication apparatus 151. The connection mode for the communication apparatus 151 may be automatically selected by the setup program based on the communication environment of the information processing apparatus 101. For example, if the information processing apparatus 101 connects to any AP when a connection mode for the communication apparatus 151 is set, the infrastructure connection mode is selected as a connection mode for the communication apparatus 151. Alternatively, for example, if the information processing apparatus 101 does not connect to any AP when a connection mode for the communication apparatus 151 is set, the direct connection mode such as the WFD mode or the soft AP mode is selected as a connection mode for the communication apparatus 151.

In step S506, the CPU 103 determines whether the infrastructure connection mode has been selected (the direct connection mode has been selected) in step S505. If the CPU 103 determines that the infrastructure connection mode has been selected (YES in step S506), the processing proceeds to step S507. If the CPU 103 determines that the infrastructure connection mode has not been selected (NO in step S506), the processing proceeds to step S509.

In step S507 performed when the CPU 103 determines that the infrastructure connection mode has been selected in step S506, the CPU 103 transmits infrastructure setting information to the communication apparatus 151 using Setting Method 1. Specifically, first of all, the CPU 103 temporarily stores into the RAM 105 AP information regarding the AP to which the information processing apparatus 101 connects currently (i.e., when a predetermined operation is received). Then, the CPU 103 disconnects the connection between the AP and the information processing apparatus 101. At this time, if the AP to which the information processing apparatus 101 currently connects does not exist, the processing is skipped. After that, the CPU 103 connects the information processing apparatus 101 and the AP dedicated for the connection setting mode. In other words, the CPU 103 connects the information processing apparatus 101 and the communication apparatus 151 operating in the connection setting mode. Then, the CPU 103 transmits the AP information temporarily stored in the RAM 105 to the communication apparatus 151 as infrastructure setting information via the AP dedicated for the connection setting mode. By receiving the AP information, the communication apparatus 151 is set to the infrastructure connection mode in which connection can be established via the AP based on the AP information. At this time, AP information other than the AP information temporarily stored in the RAM 105 may be transmitted. For example, AP information regarding an AP selected from a list of APs discovered by the communication apparatus 151 by searching may be transmitted, or AP information regarding an AP selected from a list of APs discovered by the information processing apparatus 101 by the searching may be transmitted. Alternatively, for example, AP information corresponding to an SSID entered by the user may be transmitted. In step S507, the CPU 103 receives the entry of a password corresponding to AP information to be transmitted from the user, and the entered password is also transmitted as infrastructure setting information. As described above, the communication protocol used in communication in Setting Method 1 is the SNMP. After the infrastructure setting information is transmitted, the CPU 103 disconnects the connection between the information processing apparatus 101 and the AP dedicated for the connection setting mode.

In step S508, the CPU 103 connects again with an AP to which the information processing apparatus 101 has connected immediately before connecting with the communication apparatus 151 in the connection setting mode, and to which the information processing apparatus 101 has connected when a predetermined operation is received. If the AP does not exist, the processing is omitted. After that, the CPU 103 ends the processing of this flowchart.

In step S509 performed when the CPU 103 determines that the infrastructure connection mode has not been selected in step S506, the CPU 103 transmits direct setting information to the communication apparatus 151 using Setting Method 1. Specifically, first of all, the CPU 103 disconnects the connection between the information processing apparatus 101 and the AP to which the information processing apparatus 101 connects currently (i.e., when a predetermined operation is received). At this time, if an AP to which the information processing apparatus 101 currently connects does not exist, the processing is skipped. After that, the CPU 103 connects the information processing apparatus 101 and the AP dedicated for the connection setting mode. In other words, the CPU 103 connects the information processing apparatus 101 and the communication apparatus 151 operating in the connection setting mode. Then, the CPU 103 transmits direct setting information to the communication apparatus 151. After that, the CPU 103 receives from the communication apparatus 151 connection information (SSID and password) for connecting with the communication apparatus 151 operating in the direct connection mode. After that, the CPU 103 disconnects the connection between the information processing apparatus 101 and the AP dedicated for the connection setting mode, and establishes the connection between the communication apparatus 151 operating in the direct connection mode and the information processing apparatus 101 using the received connection information. As described above, the communication protocol used in communication in Setting Method 1 is the SNMP. After that, the CPU 103 ends the processing of this flowchart.

In step S510 performed when the CPU 103 determines that an apparatus operating in the state for Setting Method 2 has been discovered in step S502, the CPU 103 displays a connection mode selection screen for selecting a connection mode for the communication apparatus 151. Then, the CPU 103 selects a connection mode corresponding to the entry received from the user on the connection mode selection screen as a connection mode for the communication apparatus 151. The processing is similar to the processing in step S505.

In step S511, the CPU 103 determines whether the infrastructure connection mode has been selected (the direct connection mode has been selected) in step S510. If the CPU 103 determines that the infrastructure connection mode has been selected (YES in step S511), the processing proceeds to step S512. If the CPU 103 determines that the infrastructure connection mode has not been selected (NO in step S511), the processing proceeds to step S509.

In step S512, the CPU 103 transmits infrastructure setting information to the communication apparatus 151 using Setting Method 2. Specifically, first of all, the CPU 103 temporarily stores into the RAM 105 AP information regarding the AP to which the information processing apparatus 101 connects currently (i.e., when a predetermined operation is received). At this time, if an AP to which the information processing apparatus 101 currently connects does not exist, the processing is skipped. After that, the CPU 103 activates a predetermined setting application program, and displays a screen of the program in the foreground. The setup program for the communication apparatus 151 accordingly shifts to the background. After the predetermined setting application program is activated, the setup program for the communication apparatus 151 appropriately acquires information regarding processing performed by the predetermined setting application program. The predetermined setting application program displays a screen for selecting an AP to be connected with the communication apparatus 151. If an AP to which the information processing apparatus 101 currently connects exits, the screen includes the AP. Then, if the AP to which the information processing apparatus 101 currently connects is selected by the user, the predetermined setting application program acquires a password for connecting with the AP from an OS. In other words, the password is acquired without entry of a password from the user to the setup program for the communication apparatus 151 or the predetermined setting application program. If an AP other than the AP to which the information processing apparatus 101 currently connects is selected by the user, and the OS stores the password for connecting with the selected AP, the password is acquired from the OS. If the OS does not store the password for connecting with the selected AP, the password is acquired by the user entering the password to the predetermined setting application program. Then, the predetermined setting application program disconnects the connection between the information processing apparatus 101 and the AP to which the information processing apparatus 101 connects currently (i.e., when a predetermined operation is received). After that, the predetermined setting application program connects the communication apparatus 151 operating in the state for Setting Method 2 and the information processing apparatus 101, and connection information (acquired password and SSID) about the selected AP is transmitted. After that, the predetermined setting application program disconnects the connection between the communication apparatus 151 and the information processing apparatus 101, and establishes the connection between the selected AP and the information processing apparatus 101. After that, a screen for the setup program for the communication apparatus 151 is displayed in the foreground. As described above, the communication protocol used in communication in Setting Method 2 is the HTTP. After that, the CPU 103 ends the processing of this flowchart.

The above-described configuration allows a timeout time of a connection setting mode to be set when the user makes connection settings for the communication apparatus 151 using the information processing apparatus 101. This leads a user to have more opportunities of changing connection settings more easily, which enhances usability.

As described above, in the present embodiment, the communication apparatus 151 can start operation in the connection setting mode under various conditions. Specifically, for example, based on the transition to the software-on state and an incomplete state of a default setting (Condition 1), in step S306, the communication apparatus 151 starts operation in the connection setting mode. Alternatively, for example, based on the transition to the software-on state and a completed state of a default setting (Condition 2), in step S326, the communication apparatus 151 starts operation in the connection setting mode. Alternatively, for example, based on the reception of a predetermined operation for starting a connection setting mode (operation on the connection setting mode region 203 or operation on the connection setting mode button 211) (Condition 3), the communication apparatus 151 starts operation in the connection setting mode. Alternatively, for example, based on the reception of a reset operation (Condition 4), the communication apparatus 151 starts operation in the connection setting mode. Alternatively, for example, based on the fact that the default setting processing is completed after the connection setting mode started based on Condition 1 is stopped due to timeout (Condition 5), the communication apparatus 151 starts operation in the connection setting mode. In view of the foregoing, the communication apparatus 151 may vary the timeout time depending on the condition under which operation in the connection setting mode is started. In the present embodiment, the original timeout time for Setting Method 1 and the original timeout time for Setting Method 2 that are to be used when operation in the connection setting mode is started under Condition 1 are longer than the timeout time for Setting Method 1 and the timeout time for Setting Method 2 that are to be used when operation in the connection setting mode is started under other conditions. For example, the original timeout time for Setting Method 1 and the original timeout time for Setting Method 2 that are to be used when operation in the connection setting mode is started under Condition 1 are set to 60 minutes, and the timeout time for Setting Method 1 and the timeout time for Setting Method 2 that are to be used when operation in the connection setting mode is started under other conditions are set to 15 minutes. The timeout time for Setting Method 1 and the timeout time for Setting Method 2 may be uniformly set to the same value irrespective of a start condition for operation in the connection setting mode. In the present embodiment, the timeout time for Setting Method 1 and the timeout time for Setting Method 2 that are to be used when operation in the connection setting mode is started under Condition 1 are changed by timeout time change processing depending on the case, but the timeout time for Setting Method 1 and the timeout time for Setting Method 2 that are to be used when operation in the connection setting mode is started under other conditions are not changed. Operation in the connection setting mode is started in not all of the above-described cases. The above-described conditions may include a condition under which operation in the connection setting mode is not started. As described above, in the present embodiment, switching processing is performed of switching whether to operate the communication apparatus 151 in the connection setting mode depending on whether a USB cable or a wired LAN cable is connected. For example, a configuration may be employed of performing the switching processing in a connection setting mode started under Condition 1, 2, 4, or 5, without performing the switching processing in a connection setting mode started under Condition 3, and of always operating the communication apparatus 151 in a connection setting mode when a predetermined operation for starting the connection setting mode is performed.

A second embodiment will be described. In the present embodiment, the description will be given of a configuration of performing processing in a different form from that in the first embodiment as processing performed by the information processing apparatus 101 to cause the communication apparatus 151 to perform connection setting processing. The processing performed by the communication apparatus 151 is similar to that in the first embodiment unless otherwise stated.

FIG. 6 is a flowchart illustrating processing performed by the information processing apparatus 101 to cause the communication apparatus 151 to perform connection setting processing. The processing of the flowchart is performed by the CPU 103 loading a setup program for the communication apparatus 151 that is stored in the ROM 104 or an external storage device (not illustrated) onto the RAM 105, and running the setup program for the communication apparatus 151. The processing of the flowchart is started by a setting instruction being received from the user on a screen displayed by the setup program for the communication apparatus 151.

First of all, in step S601, the CPU 103 temporarily stores into the RAM 105 AP information regarding the AP to which the information processing apparatus 101 connects currently (i.e., when a predetermined operation is received). At this time, if an AP to which the information processing apparatus 101 currently connects does not exist, the processing is skipped.

In step S602, the CPU 103 searches for an AP accessible by the information processing apparatus 101 via the communication unit 109. The AP search may be automatically performed when the setup program is activated, or may be performed in response to an instruction issued by the user. The AP search is performed by the communication unit 109 receiving a beacon transmitted by each AP.

In step S603, the CPU 103 displays on the operation display unit 108 a list of APs (AP search result) discovered by the AP search in step S602. At this time, for example, the CPU 103 displays a list of the SSIDs allocated to the respective APs. In step S603, the CPU 103 may automatically extract an AP having an SSID in a format conforming to the above-described rule that configures the SSID of the AP dedicated for the connection setting mode, and display the AP. At this time, if a plurality of SSIDs in the format conforming to the above-described rule exists, the SSIDs are displayed, and the user is prompted to select an AP from the SSIDs. With this configuration, the processing in step S605 to be described below is not performed.

If APs are displayed in step S603, the user selects the AP corresponding to the communication apparatus to be set to connection mode from the search result. The CPU 103 receives the selection of the AP.

In step S604, the CPU 103 determines whether the AP selected in step S603 is the AP corresponding to the communication apparatus to be set by the setup program. At this time, specifically, the CPU 103 determines whether the selected AP is an AP having an SSID in a format conforming to the above-described rule that configures the SSID of the AP dedicated for the connection setting mode. If the CPU 103 determines that the selected AP is not an AP in a communication apparatus to be set by the setup program (NO in step S604), the CPU 103 waits for the detection made by the user again of the selection of an AP. At this time, the CPU 103 may display a screen for notifying the user that an inappropriate AP has been selected, on the operation display unit 108. If the AP corresponding to the communication apparatus to be set does not exist, or an AP in a communication apparatus desired by the user does not exist, the CPU 103 returns the processing to step S603, or may end the processing of this flowchart.

The above description has been given of a configuration in which the user is prompted to manually select an AP for a communication apparatus to be set to a connection mode, by the processing in steps S603 and S604, but the configuration is not limited to this configuration. For example, the CPU 103 may automatically select from among the APs discovered by the search in step S602 an AP having an SSID in a format conforming to the above-described rule as an AP for a communication apparatus to be set to a connection mode.

If the communication apparatus to be set (the communication apparatus 151 in this example) is selected in step S603, the CPU 103 exchanges parameters (connection information) for establishing wireless connection between the information processing apparatus 101 and the communication apparatus 151. The connection information for connecting with the AP dedicated for the connection setting mode is preliminarily stored by the setup program. The information processing apparatus 101 thereby connects to the AP dedicated for the connection setting mode, and establishes communication with the communication apparatus 151.

In step S605, the CPU 103 displays a connection mode selection screen for receiving the selection of a connection mode for the communication apparatus 151 from the user. In the present embodiment, options to be displayed on the connection mode selection screen include the infrastructure connection mode and the direct connection mode. For example, a button for the setup program automatically selecting a connection mode for the communication apparatus 151 between the infrastructure connection mode and the direct connection mode may also be displayed on the connection mode selection screen. If the button is pressed, the CPU 103 selects the infrastructure connection mode with the information processing apparatus 101 in connection with an AP when a predetermined operation is received. If the information processing apparatus 101 does not connect to an AP when a predetermined operation is received, the CPU 103 selects the direct connection mode.

In step S606, the CPU 103 determines whether the infrastructure connection mode has been selected on the connection mode selection screen. If the CPU 103 determines that the infrastructure connection mode has been selected on the connection mode selection screen (YES in step S606), the processing proceeds to step S607. If the CPU 103 determines that the infrastructure connection mode has not been selected on the connection mode selection screen (NO in step S606), the processing proceeds to step S610.

In step S607, the CPU 103 determines whether the communication apparatus 151 supports Setting Method 2. As described above, when the communication apparatus 151 operates in the state for Setting Method 2, the communication apparatus 151 transmits a predetermined beacon. Thus, for example, if the predetermined beacon transmitted by the communication apparatus 151 has been received, the CPU 103 determines that the communication apparatus 151 supports Setting Method 2. If the predetermined beacon transmitted by the communication apparatus 151 has not been received, the CPU 103 determines that the communication apparatus 151 does not support Setting Method 2. The determination method used in the determination is not limited to this method. For example, the CPU 103 may receive information indicating whether the communication apparatus 151 supports Setting Method 2 from the communication apparatus 151 via connection between the information processing apparatus 101 and the communication apparatus 151, and make the determination based on the received information. A case where the communication apparatus 151 supports Setting Method 2 corresponds to a case where the communication apparatus 151 is operating in the state for Setting Method 2. A case where the communication apparatus 151 does not support Setting Method 2 corresponds to a case where the communication apparatus 151 is a model that cannot use a protocol for Setting Method 2, or a case where the communication apparatus 151 can use a protocol for Setting Method 2, but is not operating in the state for Setting Method 2. If the CPU 103 determines that the communication apparatus 151 supports Setting Method 2 (YES in step S607), the processing proceeds to step S608. If the CPU 103 determines that the communication apparatus 151 does not support Setting Method 2 in the determination (NO in step S607), the processing proceeds to step S610.

In step S608, the CPU 103 displays a setting method selection screen for selecting any of a plurality of setting methods (Setting Method 1 and Setting Method 2 in this example). After that, the user selects a setting method on the setting method selection screen, and the CPU 103 receives the selection result.

In step S609, based on the selection result received in step s608, the CPU 103 determines whether Setting Method 1 has been selected (whether Setting Method 2 has been selected) by the user.

If the CPU 103 determines that Setting Method 1 has been selected (YES in step S609), the processing proceeds to step S610. If the CPU 103 determines that Setting Method 1 has not been selected (NO in step S609), the processing proceeds to step S611.

In step S610, the CPU 103 transmits setting information to the communication apparatus 151 using Setting Method 1. Specifically, the CPU 103 transmits the AP information temporarily stored in the RAM 105 in step S601 to the communication apparatus 151 as infrastructure setting information via the AP dedicated for the connection setting mode that has been connected after step S604. By receiving the AP information, the communication apparatus 151 is set to the infrastructure connection mode in which connection can be established via an AP based on the AP information. At this time, AP information other than the AP information temporarily stored in the RAM 105 in step S601 may be transmitted. For example, AP information regarding an AP selected from a list of APs discovered by the communication apparatus 151 by searching may be transmitted, or AP information regarding an AP selected from a list of APs discovered by the information processing apparatus 101 by the searching may be transmitted. Alternatively, for example, AP information corresponding to an SSID entered by the user may be transmitted. In step S610, the CPU 103 receives the entry of a password corresponding to AP information to be transmitted from the user, and the entered password is also transmitted as infrastructure setting information. At this time, setting information for setting the communication apparatus 151 to a different connection mode such as the WFD mode or the soft AP mode, for example, may be transmitted instead of infrastructure setting information. The connection mode for the communication apparatus 151 may be determined by receiving the selection from the user via a screen displayed by the setup program, for example, or may be automatically determined by the setup program based on a communication environment of the information processing apparatus 101. For example, if the information processing apparatus 101 connects to an AP when a connection mode for the communication apparatus 151 is set, the infrastructure connection mode is selected as a connection mode for the communication apparatus 151. Alternatively, for example, if the information processing apparatus 101 does not connect to any AP when a connection mode for the communication apparatus 151 is set, a connection mode for the P2P method such as the WFD mode or the soft AP mode is selected as a connection mode for the communication apparatus 151.

In step S611, the CPU 103 transmits setting information to the communication apparatus 151 using Setting Method 2. A password included in the setting information to be transmitted at this time is not acquired by the setup program for the communication apparatus 151 receiving the user entry as described above, but automatically acquired from the OS.

In step S612, the CPU 103 disconnects the connection to the AP dedicated for the connection setting mode, and connects again to an AP based on the AP information temporarily stored in the RAM 105 in step S601. With this configuration, if the AP information is transmitted to the communication apparatus 151 and the communication apparatus 151 has connected to an AP based on the AP information, the information processing apparatus 101 becomes able to communicate with the communication apparatus 151 via the AP. In a case where the information processing apparatus 101 becomes able to perform communication, the CPU 103 registers the communication apparatus 151 into the RAM 105 as a communication apparatus to which the information processing apparatus 101 is to connect later. After that, the CPU 103 ends the setup program.

The processing in steps S602 to S604 is not always performed by the setup program. A different application installed on the information processing apparatus 101 may search for the AP dedicated for the connection setting mode, and the setup program may acquire the result.

In the above description, because the CPU 103 communicates with the communication apparatus 151 via the AP dedicated for the connection setting mode, the CPU 103 transmits setting information to the communication apparatus 151 in compliance with an IEEE 802.11 series communication standard (i.e., Wi-Fi®). Nevertheless, the configuration is not limited to this configuration. The CPU 103 may transmit setting information to the communication apparatus 151 in compliance with a communication standard different from an IEEE 802.11 series communication standard, for example. The communication standard to be used at this time includes, for example, Bluetooth® Classic, Bluetooth® Low Energy, Near Field Communication, and Wi-Fi Aware®. With such a configuration, the CPU 103 can transmit setting information to the communication apparatus 151 in compliance with a different communication standard while maintaining Wi-Fi® connection with an AP to be used in the infrastructure connection mode.

Other Embodiments

The above description has been given of a configuration in which, if a communication apparatus is still operating in a connection setting mode after default setting processing, at least one of two pieces of timeout time change processing is performed, but the configuration is not limited to this configuration. Depending on the remaining time, the change processing to be performed may be skipped in some cases. Specifically, while the timeout time change processing 1 is performed in a case where the CPU 154 determines that each elapsed time measured by timer measurement is short in step S319, the processing may proceed to step S322 without performing the timeout time change processing 2 in a case where the CPU 154 determines that each elapsed time measured by timer measurement is not short in step S319.

In the above description, the original timeout time for Setting Method 1 and the original timeout time for Setting Method 2 that are set before timeout time change processing is performed are the same, but the configuration is not limited to this configuration. More specifically, the timeout time for Setting Method 1 and the timeout time for Setting Method 2 may be different from each other. At this time, the timeout time set for Setting Method 2 may be smaller than that set for Setting Method 1.

The above description has been given of a configuration in which at least one of the timeout time for Setting Method 2 or the elapsed time of the state for Setting Method 2 is changed in the timeout time change processing 1, and the timeout time for Setting Method 1 and the elapsed time of the state for Setting Method 1 are not changed, but the configuration is not limited to this configuration.

For example, a configuration may be employed in which, in the timeout time change processing 1, at least one of the timeout time for Setting Method 1 or the elapsed time of the state for Setting Method 1 is changed, and the timeout time for Setting Method 2 and the elapsed time of the state for Setting Method 2 are not changed. Alternatively, a configuration may be employed in which at least one of the timeout time for Setting Method 1 or the elapsed time of the state for Setting Method 1, and at least one of the timeout time for Setting Method 2 or the elapsed time of the state for Setting Method 2 are changed. If at least one of the timeout time for Setting Method 1 or the elapsed time of the state for Setting Method 1 is changed, the change method is similar to the change method for at least one of the timeout time for Setting Method 2 or the elapsed time of the state for Setting Method 2 that has been described in the description of the timeout time change processing 1.

The above description has been given of a configuration in which the communication apparatus 151 can perform both operation in the state for Setting Method 1 and operation in the state for Setting Method 2, but the configuration is not limited to this configuration. For example, a configuration may be employed in which the communication apparatus 151 can perform operation in the state for Setting Method 2 alone. In this case, the elapsed time of the state for Setting Method 1 is not counted, and the timeout time for Setting Method 2 alone is changed in timeout time change processing. In this case, the determination in step S319 may be omitted and control may be performed in such a manner that a value obtained by subtracting the elapsed time from a timeout time always becomes a predetermined value (e.g., 15 minutes). The above-described embodiments are also implemented by performing the following processing. More specifically, the processing is processing of supplying software (program) implementing the functions of the above-described embodiments, to a system or an apparatus via a network or various storage media, and a computer (CPU, micro processing unit (MPU), etc.) of the system or the apparatus to read the program and run the program. In addition, the program may be run by one computer or a plurality of computers in cooperation with each other. In addition, not all of the above-described processes are implemented by software, and a part or all of the processes may be implemented by hardware such as an application specific integrated circuit (ASIC). In addition, not all of the processes are performed by one CPU, and the processes may be performed by a plurality of CPUs in cooperation with each other as necessary.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments, but is defined by the scope of the following claims.

This application claims the benefit of Japanese Patent Application No. 2021-117578, filed Jul. 16, 2021, which is hereby incorporated by reference herein in its entirety.

What is claimed is:

1. A communication apparatus comprising:
one or more memories storing instructions, and
one or more processors coupled to the one or more memories, wherein execution of the instructions causes the one or more processors to perform operation of:
causing the communication apparatus to start operation in a predetermined mode for receiving setting information from an information processing apparatus;
making connection setting of the communication apparatus based on the setting information in a case where the setting information is received from the information processing apparatus during the operation in the predetermined mode;
performing predetermined processing to be completed based on a user operation;
counting a value corresponding to a time after the operation in the predetermined mode by the communication apparatus is started; and
determining whether to stop the operation in the predetermined mode, based on the counted value and a predetermined threshold value; and
in a case where the communication apparatus is operating in the predetermined mode and the predetermined processing is not completed, perform first control for stopping the operation in the predetermined mode based on a first time having elapsed with the connection setting not made since the operation in the predetermined mode by the communication apparatus was started, and
in a case where the communication apparatus is operating in the predetermined mode and the predetermined processing is completed, perform second control for stopping the operation in the predetermined mode based on a second time having elapsed with the connection setting not made since the operation in the predetermined mode by the communication apparatus was started, the second time being shorter than the first time,
wherein the first control includes processing of determining whether to stop the operation in the predetermined mode, based on the counted value and the predetermined threshold value corresponding to the first time, and
wherein the second control includes change processing including at least one of a change of increasing the counted value or a change of decreasing the predetermined threshold value, and processing of determining whether to stop the operation in the predetermined mode, based on the counted value and the predetermined threshold value that have been subjected to the change processing.

2. The communication apparatus according to claim 1, wherein, in a case where the predetermined processing is completed during the operation in the predetermined mode, whether to perform the second control is controlled based on a time that has elapsed since the operation in the predetermined mode by the communication apparatus was started.

3. The communication apparatus according to claim 2, wherein, in a case where the predetermined processing is completed during the operation in the predetermined mode and the time that has elapsed since the operation in the predetermined mode by the communication apparatus was started is longer than a specific threshold value, the second control is not performed, and
wherein, in a case where the predetermined processing is completed during the operation in the predetermined mode and the time that has elapsed since the operation in the predetermined mode by the communication apparatus was started is not longer than the specific threshold value, the second control is performed.

4. The communication apparatus according to claim 3, wherein, in a case where the predetermined processing is completed during the operation in the predetermined mode and the time that has elapsed since the operation in the predetermined mode by the communication apparatus was started is longer than a specific threshold value, third control is performed, the third control being for stopping the operation in the predetermined mode based on a third time having elapsed with the connection setting not made since the operation in the predetermined mode by the communication apparatus was started, the third time being longer than the first time.

5. The communication apparatus according to claim 1, further comprising a second start unit configured to cause the communication apparatus to start operation in a specific mode that is a mode different from the predetermined mode and is a mode for receiving setting information from the information processing apparatus,
wherein, in a case where the communication apparatus is operating in the specific mode and the predetermined processing is not completed, fourth control for stopping the operation in the specific mode based on a fourth time having has elapsed with the connection setting not made since the operation in the specific mode by the communication apparatus was started is performed.

6. The communication apparatus according to claim 5, wherein, even when the second control has been performed, fifth control is not performed, the fifth control being for stopping the operation in the specific mode based on a fifth time having elapsed with the connection setting not made since the operation in the specific mode by the communication apparatus was started, the fifth time being shorter than the fourth time, and the fourth control is performed.

7. The communication apparatus according to claim 5, wherein, in a case where the predetermined processing is completed during the operation in the specific mode and a time that has elapsed since the operation in the specific mode by the communication apparatus was started is longer than a specific threshold value, sixth control is performed, the sixth control being for stopping the operation in the specific mode based on a sixth time having elapsed with the connection setting not made since the operation in the specific mode by the communication apparatus was started, the sixth time being longer than the fourth time.

8. The communication apparatus according to claim 5, wherein the first time and the fourth time are equal.

9. The communication apparatus according to claim 5, wherein the operation in the predetermined mode and the operation in the specific mode are started based on an identical condition.

10. The communication apparatus according to claim 5, wherein the predetermined mode is a mode for communicating the setting information in compliance with a first protocol, and the specific mode is a mode for communicating the setting information in compliance with a second protocol.

11. The communication apparatus according to claim 10, wherein the first protocol is a Hyper Text Transfer Protocol (HTTP) or a Device Provisioning Protocol (DPP), and the second protocol is a Simple Network Management Protocol (SNMP).

12. The communication apparatus according to claim 5, wherein the predetermined mode is a mode for receiving from a first application program for the information processing apparatus the setting information including a password, without a user entering the password to the first application program, and
wherein the specific mode is a mode for receiving from a second application program for the information processing apparatus the setting information including the password after a user enters the password to the first application program.

13. The communication apparatus according to claim 1, wherein the communication apparatus is configured to be caused to start the operation in the predetermined mode based on a press of a power button of the communication apparatus in a state the predetermined processing has never been completed in the communication apparatus.

14. The communication apparatus according to claim 13, wherein the communication apparatus is configured to be caused to start the operation in the predetermined mode based on the press of the power button of the communication apparatus in a state in which the predetermined processing has never been completed in the communication apparatus, and on a condition that a universal serial bus (USB) cable is not connected to the communication apparatus, and
wherein, in a case where the power button of the communication apparatus is pressed in a state in which the predetermined processing has never been completed in the communication apparatus and a USB cable is connected to the communication apparatus, the communication apparatus is not configured to be caused to start the operation in the predetermined mode.

15. The communication apparatus according to claim 13, wherein, in a case where the operation in the predetermined mode is started based on a different condition other than the press of the power button of the communication apparatus in a state in which the predetermined processing has never been completed in the communication apparatus, control for stopping the operation in the predetermined mode based on a time different from the first time and the second time is performed, the different time having elapsed with the connection setting not made since the operation in the predetermined mode by the communication apparatus was started.

16. The communication apparatus according to claim 15, wherein the different condition is at least one of the press of the power button of the communication apparatus in a state in which the predetermined processing has ever been completed in the communication apparatus, execution of a predetermined operation as an operation for the communication apparatus to start in a connection setting mode and as an operation different from the press of the power button, or completion of the predetermined processing after the operation in the connection setting mode being stopped based on the first time having elapsed with the connection setting not made since the operation in the connection setting mode by the communication apparatus was started.

17. The communication apparatus according to claim 1,
wherein the predetermined processing is default setting processing for making default setting of the communication apparatus, and
wherein the default setting processing includes at least one of processing of cleaning a component included in the communication apparatus, reception processing of a user operation for setting a language to be used for display by the communication apparatus, reception processing of a user operation regarding an environment for use of the communication apparatus, or registration adjustment.

18. The communication apparatus according to claim 1, wherein connection setting of the communication apparatus includes processing of connecting the communication apparatus and an access point existing outside of the communication apparatus and outside of the information processing apparatus.

19. The communication apparatus according to claim 1,
wherein the predetermined mode is a mode for receiving from a predetermined application program for the information processing apparatus the setting information including a password without a user entering the password to the predetermined application program, and
wherein the predetermined mode is a mode for receiving the setting information in compliance with a Hyper Text Transfer Protocol (HTTP) or a mode for receiving the setting information in compliance with a Device Provisioning Protocol (DPP).

20. The communication apparatus according to claim 1, further comprising a printing unit configured to perform printing.

21. A communication apparatus comprising:
one or more memories storing instructions, and
one or more processors coupled to the one or more memories, wherein execution of the instructions causes the one or more processors to perform operation of:
causing the communication apparatus to start operation in a predetermined mode for receiving setting information from an information processing apparatus;
making connection setting of the communication apparatus based on the setting information in a case where the setting information is received from the information processing apparatus during the operation in the predetermined mode;

performing predetermined processing to be completed based on a user operation; and in a case where the communication apparatus is operating in the predetermined mode and the predetermined processing is not completed, perform first control for stopping the operation in the predetermined mode based on a first time having elapsed with the connection setting not made since the operation in the predetermined mode by the communication apparatus was started, and in a case where the communication apparatus is operating in the predetermined mode and the predetermined processing is completed, perform second control for stopping the operation in the predetermined mode based on a second time having elapsed with the connection setting not made since the operation in the predetermined mode by the communication apparatus was started, the second time being shorter than the first time, wherein, in a case where the predetermined processing is completed during the operation in the predetermined mode, whether to perform the second control is controlled based on a time that has elapsed since the operation in the predetermined mode by the communication apparatus was started, wherein, in a case where the predetermined processing is completed during the operation in the predetermined mode and the time that has elapsed since the operation in the predetermined mode by the communication apparatus was started is longer than a specific threshold value, the second control is not performed, and wherein, in a case where the predetermined processing is completed during the operation in the predetermined mode and the time that has elapsed since the operation in the predetermined mode by the communication apparatus was started is not longer than the specific threshold value, the second control is performed, wherein, in a case where the predetermined processing is completed during the operation in the predetermined mode and the time that has elapsed since the operation in the predetermined mode by the communication apparatus was started is longer than a specific threshold value, third control is performed, the third control being for stopping the operation in the predetermined mode based on a third time having elapsed with the connection setting not made since the operation in the predetermined mode by the communication apparatus was started, the third time being longer than the first time.

22. A communication apparatus comprising:

one or more memories storing instructions, and one or more processors coupled to the one or more memories, wherein execution of the instructions causes the one or more processors to perform operation of:

causing the communication apparatus to start operation in a predetermined mode for receiving setting information from an information processing apparatus;

making connection setting of the communication apparatus based on the setting information in a case where the setting information is received from the information processing apparatus during the operation in the predetermined mode;

performing predetermined processing to be completed based on a user operation; and in a case where the communication apparatus is operating in the predetermined mode and the predetermined processing is not completed, perform first control for stopping the operation in the predetermined mode based on a first time having elapsed with the connection setting not made since the operation in the predetermined mode by the communication apparatus was started, and in a case where the communication apparatus is operating in the predetermined mode and the predetermined processing is completed, perform second control for stopping the operation in the predetermined mode based on a second time having elapsed with the connection setting not made since the operation in the predetermined mode by the communication apparatus was started, the second time being shorter than the first time, causing the communication apparatus to start operation in a specific mode that is a mode different from the predetermined mode and is a mode for receiving setting information from the information processing apparatus, wherein, in a case where the communication apparatus is operating in the specific mode and the predetermined processing is not completed, fourth control for stopping the operation in the specific mode based on a fourth time having elapsed with the connection setting not made since the operation in the specific mode by the communication apparatus was started is performed, wherein the predetermined mode is a mode for communicating the setting information in compliance with a first protocol, and the specific mode is a mode for communicating the setting information in compliance with a second protocol.

* * * * *